(12) United States Patent
Xue et al.

(10) Patent No.: US 12,016,065 B2
(45) Date of Patent: Jun. 18, 2024

(54) DISCOVERY AND MEASUREMENT TIMING CONFIGURATIONS FOR NEW RADIO SIDELINK COMMUNICATIONS

(71) Applicant: QUALCOMM Incorporated, San Diego, CA (US)

(72) Inventors: Yisheng Xue, San Diego, CA (US); Xiaoxia Zhang, San Diego, CA (US); Jing Sun, San Diego, CA (US); Chih-Hao Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 319 days.

(21) Appl. No.: 17/454,858

(22) Filed: Nov. 15, 2021

(65) Prior Publication Data
US 2023/0156834 A1 May 18, 2023

(51) Int. Cl.
| | |
|---|---|
| *H04W 76/14* | (2018.01) |
| *H04L 1/00* | (2006.01) |
| *H04L 5/00* | (2006.01) |
| *H04W 56/00* | (2009.01) |
| *H04W 72/20* | (2023.01) |

(52) U.S. Cl.
CPC .......... *H04W 76/14* (2018.02); *H04L 1/0026* (2013.01); *H04L 5/0048* (2013.01); *H04W 56/001* (2013.01); *H04W 72/20* (2023.01)

(58) Field of Classification Search
CPC ......... H04W 4/40; H04W 8/00; H04W 48/08; H04W 72/04; H04W 72/12; H04W 76/14; H04B 7/08; H04B 7/06; H04B 7/0632
See application file for complete search history.

(56) References Cited

U.S. PATENT DOCUMENTS

| | | | | |
|---|---|---|---|---|
| 2011/0205969 | A1* | 8/2011 | Ahmad | H04W 16/28 370/328 |
| 2017/0111122 | A1* | 4/2017 | Shimizu | H04W 4/80 |
| 2019/0372647 | A1* | 12/2019 | Su | H04B 7/06954 |
| 2020/0252990 | A1* | 8/2020 | Ganesan | H04W 76/14 |
| 2022/0210779 | A1* | 6/2022 | Shin | H04W 72/20 |
| 2022/0399917 | A1* | 12/2022 | Shin | H04B 17/318 |
| 2022/0399927 | A1* | 12/2022 | Tsai | H04B 7/0617 |
| 2023/0224987 | A1* | 7/2023 | Kim | H04B 17/373 370/315 |
| 2023/0371093 | A1* | 11/2023 | Kim | H04W 4/40 |

* cited by examiner

*Primary Examiner* — Mahran Y Abu Roumi
(74) *Attorney, Agent, or Firm* — QUALCOMM Incorporated

(57) ABSTRACT

Wireless communications systems and methods related to communicating control information are provided. A method of wireless communication performed by a first sidelink user equipment (UE) may include establishing, with a second sidelink UE, a beamformed link, transmitting, to the second sidelink UE, a periodic discovery and measurement timing (DMTC) configuration via the beamformed link, and transmitting, to the second sidelink UE, a periodic beacon signal based on the DMTC configuration.

30 Claims, 10 Drawing Sheets

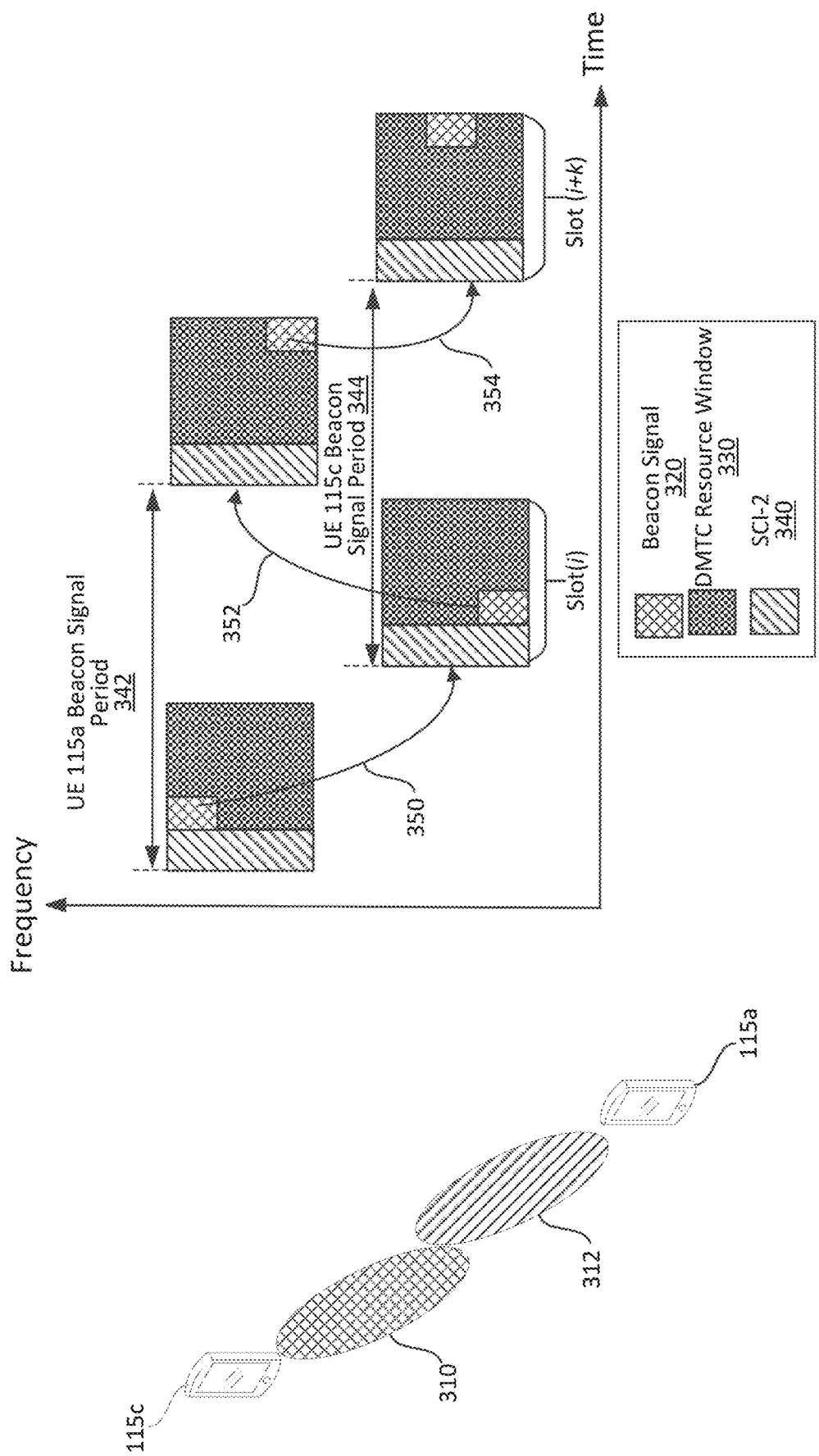

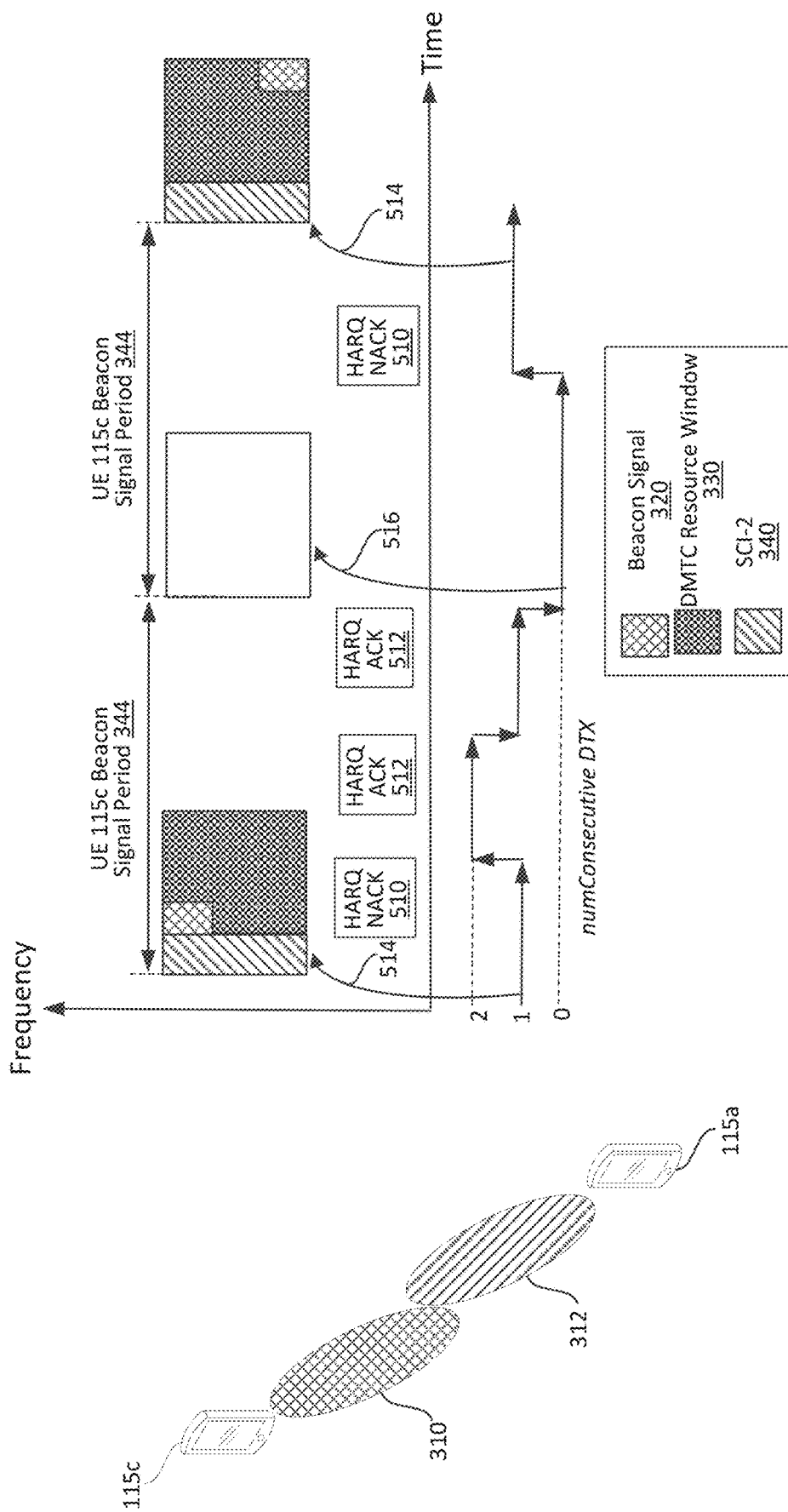

DISCOVERY AND MEASUREMENT TIMING CONFIGURATIONS FOR NEW RADIO SIDELINK COMMUNICATIONS

TECHNICAL FIELD

This application relates to wireless communication systems, and more particularly, to discovery and measurement timing configurations for new radio sidelink communications.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR may support various deployment scenarios to benefit from the various spectrums in different frequency ranges, licensed and/or unlicensed, and/or coexistence of the LTE and NR technologies. For example, NR can be deployed in a standalone NR mode over a licensed and/or an unlicensed band or in a dual connectivity mode with various combinations of NR and LTE over licensed and/or unlicensed bands.

In a wireless communication network, a BS may communicate with a UE in an uplink direction and a downlink direction. Sidelink was introduced in LTE to allow a UE to send data to another UE (e.g., from one vehicle to another vehicle) without tunneling through the BS and/or an associated core network. The LTE sidelink technology has been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication performed by a first sidelink user equipment (UE) may include establishing, with a second sidelink UE, a beamformed link; transmitting, to the second sidelink UE, a periodic discovery and measurement timing (DMTC) configuration via the beamformed link; and transmitting, to the second sidelink UE, a periodic beacon signal based on the DMTC configuration.

In an additional aspect of the disclosure, a method of wireless communication performed by a first sidelink user equipment (UE) may include establishing, with a second sidelink UE, a beamformed link; receiving, from the second sidelink UE, a periodic discovery and measurement timing (DMTC) configuration via the beamformed link; and receiving, from the second sidelink UE, a periodic beacon signal based on the DMTC configuration.

In an additional aspect of the disclosure, a first sidelink user equipment (UE) may include a memory; a transceiver; and at least one processor coupled to the memory and the transceiver, wherein the first sidelink UE is configured to establish, with a second sidelink UE, a beamformed link; transmit, to the second sidelink UE, a periodic discovery and measurement timing (DMTC) configuration via the beamformed link, and transmit, to the second sidelink UE, a periodic beacon signal based on the DMTC configuration.

In an additional aspect of the disclosure, a first sidelink user equipment (UE) may include a memory; a transceiver; and at least one processor coupled to the memory and the transceiver, wherein the first sidelink UE is configured to establish, with a second sidelink UE, a beamformed link; receive, from the second sidelink UE, a periodic discovery and measurement timing (DMTC) configuration via the beamformed link; and receive, from the second sidelink UE, a periodic beacon signal based on the DMTC configuration.

Other aspects, features, and instances of the present invention will become apparent to those of ordinary skill in the art, upon reviewing the following description of specific, exemplary instances of the present invention in conjunction with the accompanying figures. While features of the present invention may be discussed relative to certain aspects and figures below, all instances of the present invention can include one or more of the advantageous features discussed herein. In other words, while one or more instances may be discussed as having certain advantageous features, one or more of such features may also be used in accordance with the various instances of the invention discussed herein. In similar fashion, while exemplary aspects may be discussed below as device, system, or method instances it should be understood that such exemplary instances can be implemented in various devices, systems, and methods.

BRIEF DESCRIPTION OF THE DRAWINGS

FIG. 3A illustrates an established beamformed link according to some aspects of the present disclosure.

FIG. 3B illustrates resources associated with a beacon signal according to some aspects of the present disclosure.

FIG. 5A illustrates an established beamformed link according to some aspects of the present disclosure.

FIG. 5B illustrates resources associated with a beacon signal according to some aspects of the present disclosure.

DETAILED DESCRIPTION

Figure 1:
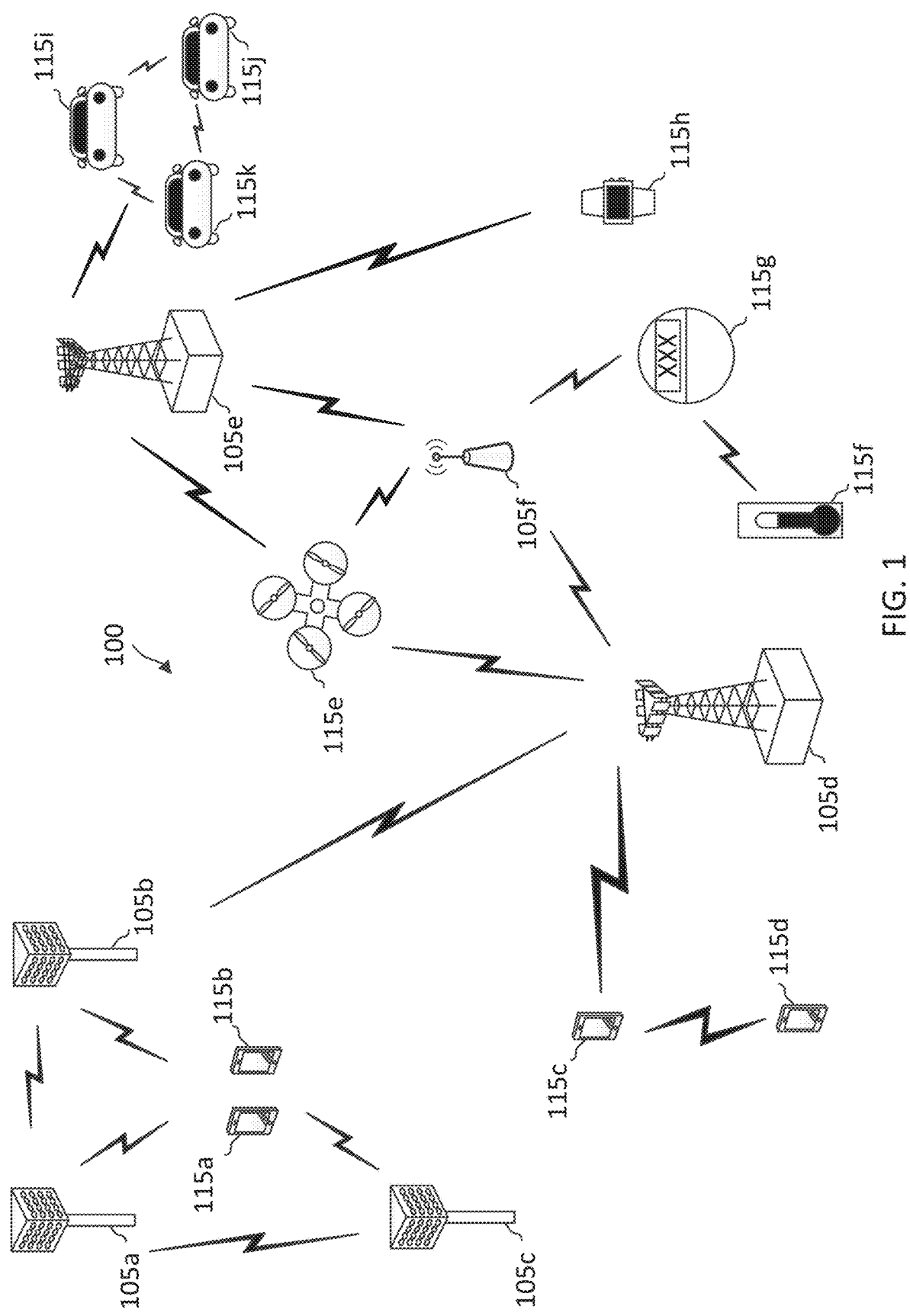
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronic Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Aspects of the present disclosure may provide several benefits. Sidelink UEs may form communication links between one another. The established link may be a beamformed link. The beamformed link may be a directional link established by one more directional antennas in each of the UEs. The beamformed link may enable higher data rates for longer distances compared to non-beamformed links using omni-directional antennas. The beamformed link may compensate for pathloss at higher frequencies (e.g., FR2, FR2x frequencies). As beamforming enables directional transmission between the UEs, the beamformed link between the UEs may allow for spatial reuse of available resources due to reduced interference among the UEs.

FIG. 1 illustrates a wireless communication network 100 according to some aspects of the present disclosure. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a vehicle (e.g., a car, a truck, a bus, an autonomous vehicle, an aircraft, a boat, etc.). Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some instances, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some instances, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some instances, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some instances, a UE 115 attempting to access the network 100 may perform an initial cell search by detecting a PSS from a BS 105. The PSS may enable synchronization of period timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In some aspects, the UEs 115*c* and UE 115*d* may be sidelink UEs. The sidelink UEs 115*c* and 115*d* may form a communication link between one another. The established link may be a beamformed link. The beamformed link may be a directional link established by one more directional antennas in each of the UE 115*c* and the UE 115*d*. The beamformed link may enable higher data rates for longer distances compared to non-beamformed links using omnidirectional antennas. The beamformed link may compensate for pathloss at higher frequencies (e.g., FR2, FR2x frequencies). As beamforming enables directional transmission between the UE 115*c* and the UE 115*d*, the beamformed link between the UE 115*c* and the UE 115*d* may allow for spatial reuse of available resources in the network 100 due to reduced interference among the UEs.

Figure 2:
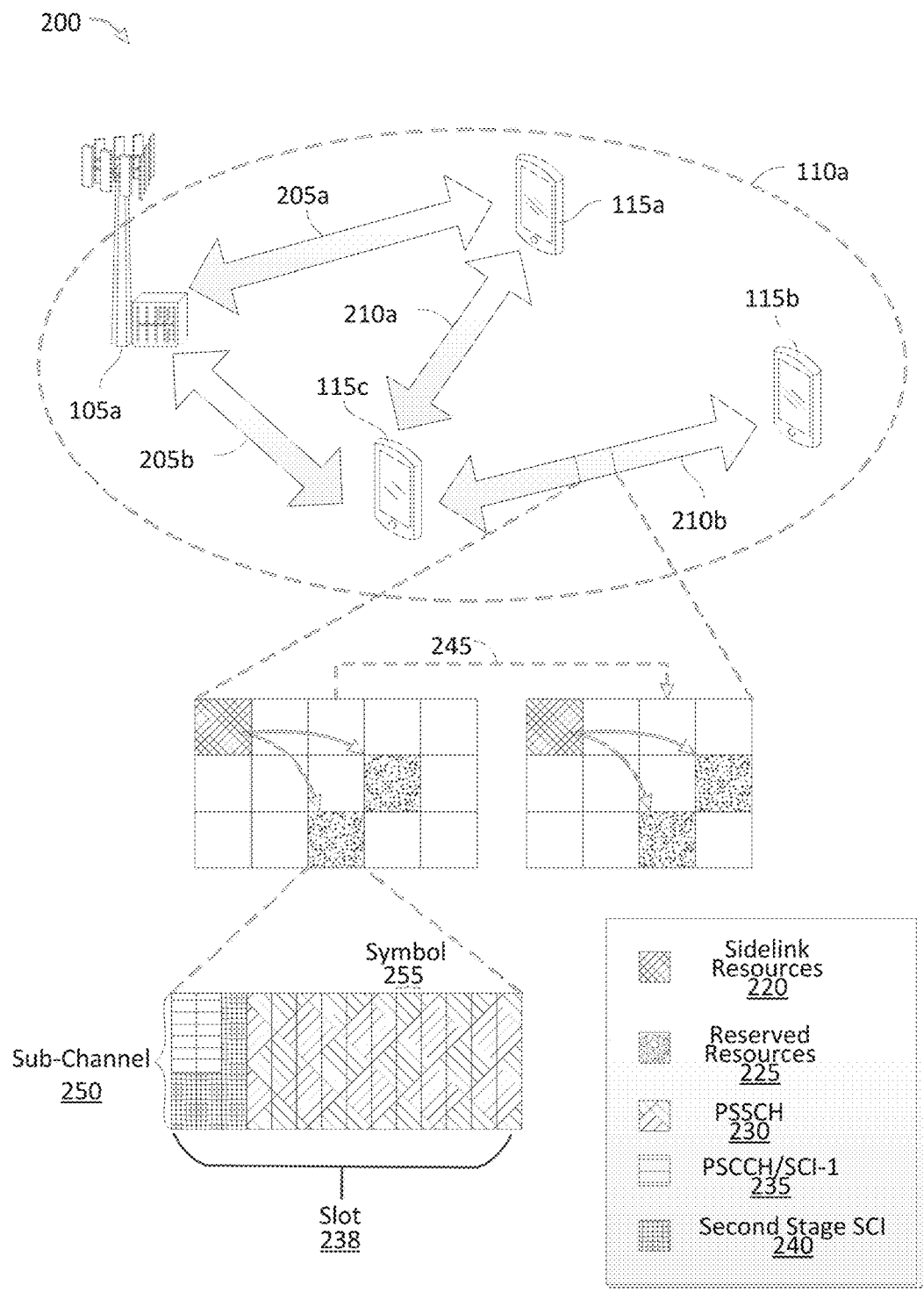
FIG. 2 illustrates a sidelink wireless communication network according to some aspects of the present disclosure.

FIG. 2 illustrates sidelink resources associated with a wireless communication network 200 according to some aspects of the present disclosure. The wireless communications network 200 may include a base station 105*a* and UEs 115*a*, 115*b*, and 115*c*, which may be examples of a BS 105 and a UE 115 as described with reference to FIG. 1. Base station 105*a* and UEs 115*a* and 115*c* may communicate within geographic coverage area 110*a* and via communication links 205*a* and 205*b*, respectively. UE 115*c* may communicate with UEs 115*a* and 115*b* via sidelink communication links 210*a* and 210*b*, respectively. In some examples, UE 115*c* may transmit SCI to UEs 115*a* and 115*b* via the sidelink control resources 220. The SCI may include an indication of resources reserved for retransmissions by UE 115*c* (e.g., the reserved resources 225). In some examples, UEs 115*a* and 115*b* may determine to reuse one or more of the reserved resources 225.

In some aspects, a device in the wireless communication network 200 (e.g., a UE 115, a BS 105, or some other node) may convey SCI to another device (e.g., another UE 115, a BS 105, sidelink device or vehicle-to-everything (V2X) device, or other node). The SCI may be conveyed in one or more stages. The first stage SCI may be carried on the PSCCH while the second stage SCI may be carried on the corresponding PSSCH. For example, UE 115*c* may transmit a PSCCH/first stage SCI 235 (e.g., SCI-1) to each sidelink UE 115 in the network (e.g., UEs 115*a* and 115*b*) via the sidelink communication links 210. The PSCCH/first stage SCI-1 235 may indicate resources that are reserved by UE 115*c* for retransmissions (e.g., the SCI-1 may indicate the reserved resources 225 for retransmissions). Each sidelink UE 115 may decode the first stage SCI-1 to determine where the reserved resources 225 are located (e.g., to refrain from using resources that are reserved for another sidelink transmission and/or to reduce resource collision within the wireless communications network 200). Sidelink communication may include a mode 1 operation in which the UEs 115 are in a coverage area of BS 105*a*. In mode 1, the UEs 115 may receive a configured grant from the BS 105*a* that defines parameters for the UEs 115 to access the channel. Sidelink communication may also include a mode 2 operation in which the UEs 115 operate autonomously from the BS 105*a* and perform sensing of the channel to gain access to the channel. In some aspects, during mode 2 sidelink operations, the sidelink UEs 115 may perform channel sensing to locate resources reserved by other sidelink transmissions. The first stage SCI-1 may reduce the need for sensing each channel. For example, the first stage SCI-1 may include an explicit indication such that the UEs 115 may refrain from blindly decoding each channel. The first stage SCI-1 may be transmitted via the sidelink control resources 220. The sidelink control resources 220 may be configured resources (e.g., time resources or frequency resources) transmitted via a PSCCH 235. In some examples, the PSCCH 235 may be configured to occupy a number of physical resource blocks (PRBs) within a selected frequency. The frequency may include a single subchannel 250 (e.g., 10, 12, 15, 20, 25, or some other number of RBs within the subchannel 250). The time duration of the PSCCH 235 may be configured by the BS 105*a* (e.g., the PSCCH 235 may span 1, 2, 3, or some other number of symbols 255).

The first stage SCI-1 may include one or more fields to indicate a location of the reserved resources 225. For example, the first stage SCI-1 may include, without limitation, one or more fields to convey a frequency domain resource allocation (FDRA), a time domain resource allocation (TDRA), a resource reservation period 245 (e.g., a period for repeating the SCI transmission and the corresponding reserved resources 225), a modulation and coding scheme (MCS) for a second stage SCI-2 240, a beta offset value for the second stage SCI-2 240, a DMRS port (e.g., one bit indicating a number of data layers), a physical sidelink feedback channel (PSFCH) overhead indicator, a priority, one or more additional reserved bits, or a combination thereof. The beta offset may indicate the coding rate for transmitting the second stage SCI-2 240. The beta offset may indicate an offset to the MCS index. The MCS may be indicated by an index ranging from 0 to 31. For example, if the MCS is set at index 16 indicating a modulation order of 4 and a coding rate of 378, the beta offset may indicate a value of 2 thereby setting the coding rate to 490 based on an MCS index of 18. In some examples, the FDRA may be a number of bits in the first stage SCI-1 that may indicate a number of slots 238 and a number of subchannels reserved for the reserved resources 225 (e.g., a receiving UE 115 may determine a location of the reserved resources 225 based on the FDRA by using the subchannel 250 including the PSCCH 235 and first stage SCI-1 as a reference). The TDRA may be a number of bits in the first stage SCI-1 (e.g., 5 bits, 9 bits, or some other number of bits) that may indicate a number of time resources reserved for the reserved resources 225. In this regard, the first stage SCI-1 may indicate the reserved resources 225 to the one or more sidelink UEs 115 in the wireless communication network 200.

In some aspects, the UEs 115*a* and UE 115*c* may be sidelink UEs. The sidelink UEs 115*a* and 115*c* may form a communication link between one another. The established link may be a beamformed link. The beamformed link may be a (bi-)directional link established by one more directional antennas in each of the UE 115*a* and the UE 115*c*. The beamformed link may enable higher data rates for longer distances compared to non-beamformed links using omnidirectional antennas. The beamformed link may compensate for pathloss at higher frequencies (e.g., FR2, FR2x frequencies). As beamforming enables directional transmission between the UE 115*a* and the UE 115*c*, the beamformed link between the UE 115*a* and the UE 115*c* may allow for spatial reuse of available resources in the network 200 due to reduced interference among the UEs.

FIG. 3A illustrates a beamformed link between the UE 115*a* and the UE 115*c* according to some aspects of the present disclosure. The UE 115*a* and the UE 115*b* may be sidelink UEs. In this regard, the UE 115*a* may establish a radio resource control (RRC) connection with the UE 115c. In some instances, the UE 115a may establish a PC5-RRC connected mode state with the UE 115c. The PC5-RRC connected state may enable exchanging of access-stratum level information for alignment between the UE 115a (e.g., a transmitting UE) and the UE 115c (e.g., a receiving UE) to support SL unicast communications. The unicast communications may be one-to-one communications between the UE 115a and the UE 115c. In some aspects, the UE 115a may have multiple PC5-RRC connections with multiple UEs for unicast communications between the UE 115a and the multiple UEs. For example, referring to FIGS. 1, 2, 3A, 4A, and/or 5A, the UE 115c may have a PC5-RRC connection with the UE 115a and the UE 115c.

The established link may be a beamformed link. For example, the beam 310 associated with the UE 115c and the beam 312 associated with the UE 115a may create a beamformed link. The beamformed link may be a directional link established by one more directional antennas in each of the UE 115a and the UE 115c. The beamformed link may enable higher data rates for longer distances compared to non-beamformed links using omni-directional antennas. The beamformed link may compensate for pathloss at higher frequencies (e.g., FR2, FR2x frequencies). As beamforming enables directional transmission between the UE 115a and the UE 115c, the beamformed link between the UE 115a and the UE 115c may allow for spatial reuse of available resources due to reduced interference among the UEs.

FIG. 3B illustrates resources associated with a beacon signal 320 according to some aspects of the present disclosure. In FIG. 3B, the x-axis represents time in some arbitrary units and the Y-axis represents frequency in some arbitrary units. The UE 115a may transmit a periodic discovery and measurement timing (DMTC) configuration via the established link to the UE 115c. The UE 115a may transmit the periodic DMTC configuration via a beamformed link with the UE 115c. In this regard, the UE 115a may transmit the DMTC configuration to the UE 115c via a PSSCH, a physical sidelink control channel (PSCCH), or other suitable channel. The DMTC configuration may include parameters to enable the UE 115a and/or the UE 115c to measure and report the status of the beamformed links corresponding to beams 310 and 312. The DMTC configuration may specify values for DMTC parameters defining beacon signal 320 transmission timing and resources (e.g., slot(i), slot (i+k), etc.). The specified values may define periodic DMTC occasions that include periodic beacon signal transmission windows for beacon signal 320 transmissions from the UE 115a to the UE 115c and from the UE 115c to the UE 115a. The DMTC configuration may include UE 115a beacon signal period 342, UE 115c beacon signal period 344, and/or the time/frequency resources associated with a DMTC resource window 330. When operating in sidelink mode 1, the UE 115a may receive the DMTC configuration from a BS (e.g., the BS 105 or the BS 800). In this regard the UE 115a may receive the DMTC configuration from the BS in a configured grant. The UE 115a may transmit (e.g., forward) the DMTC configuration received from the BS to the UE 115c. When operating in sidelink mode 2, the UE 115a may determine the DMTC configuration. The UE 115a may transmit the DMTC configuration to the UE 115c in a configured grant. The DMTC configuration may enable beamformed radio link failure detection by the UE 115c (e.g., the receiving UE).

In some aspects, the UE 115a may transmit a periodic beacon signal 320 to the UE 115c as indicated by arrows 350 and 354 based on the DMTC configuration. In this regard, the UE 115a may transmit the beacon signal 320 to the UE 115c via a PSSCH. Additionally or alternatively, the UE 115c may transmit a periodic beacon signal 320 to the UE 115a as indicated by arrow 352 based on the DMTC configuration. In this regard, the UE 115c may transmit the beacon signal 320 to the UE 115a via a PSSCH. The UE 115c may measure aspects of the beacon signal 320 to determine the status (e.g., quality status) of the beamformed links corresponding to beams 310, 312. The status of the beacon signal 320 may include, without limitation, a channel quality indicator (CQI), a reference signal received power (RSRP), a reference signal received quality (RSRQ), a signal to interference and noise ratio (SINR), and/or a rank indicator (RI). In some aspects, the beacon signal 320 may be used by other UEs 115 to discover neighboring UEs 115. For example, the beacon signal 320 carried by the PSSCH may include information to assist RF discovery by a third UE 115 (e.g., the UE 115b). The beacon signal 320 may be received by the UE 115b and indicate the DMTC of the UE 115c or any other UE 115 that the UE 115a has a unicast connection with. For example, the beacon signal 320 may include the layer 2 ID of all UEs 115 that the UE 115a has a unicast connection with and their corresponding DMTCs. The UE 115b may determine that the UE 115a is within the vicinity of the UE 115c based on receiving the DMTC of the UE 115c.

The UE 115a may transmit the beacon signal 320 within the DMTC resource window 330. The DMTC window 330 may include a set of time and frequency resources in which the beacon signal 320 can be transmitted. For example, the DMTC resource window 330 may include a set of resource elements (REs). The set of REs may include time resources (e.g., symbols, slots (slot (i), slot (i+k)), sub-slots) and frequency resources (e.g., frequency subcarriers, frequency bands, frequency ranges). The UE 115a may transmit the beacon signal 320 in a subset of REs in the DMTC resource window 330. The DMTC configuration received by the UE 115c (e.g., from the UE 115a and/or the BS 105) may indicate the REs defining the DMTC resource window 330 and/or the subset of REs carrying the beacon signal 320. In some aspects, the UE 115c may search and/or monitor the entire DMTC resource window 330 (e.g., all REs, symbols, slots, and/or frequency subcarriers within the DMTC window) for the beacon signal 320 carried by the PSSCH in a subset of REs of the DMTC resource window 330.

The UE 115a may transmit the beacon signal 320 according to the UE 115a beacon signal period 342, for example, at about 10 ms, 20 ms, 40 ms, 80 ms, 160 ms, or any suitable periodicity. In some aspects, the beacon signal 320 may include a sidelink channel state information-reference signal (CSI-RS). The UE 115c may measure aspects of the received CSI-RS to determine the status (e.g., the quality) of the beamformed link. The status of the beacon signal 320 may include, without limitation, a channel quality indicator (CQI), a reference signal received power (RSRP), a reference signal received quality (RSRQ), a signal to interference and noise ratio (SINR), and/or a rank indicator (RI).

The UE 115c may generate a CSI report describing the quality of the beamformed link. The CSI report may include information related to the channel conditions in the beamformed link between the UE 115a and the UE 115c. For example, the CSI report may include a channel quality indicator (CQI), a reference signal received power (RSRP), a reference signal received quality (RSRQ), a signal to interference and noise ratio (SINR), and/or a rank indicator (RI).

In some aspects, the beacon signal 320 may include second-stage sidelink control information 340 (SCI-2). Additionally or alternatively, the UE 115c may determine the status of the beamformed link based upon decoding the SCI-2 340. For example, if the UE 115c successfully decodes the SCI-2 340, the UE 115c may determine the quality of the beamformed link to be acceptable. However, if the UE 115c is unable to successfully decode the SCI-2 340, the UE 115c may determine the quality of the beamformed link to be unacceptable.

If the quality of the beacon signal 320 fails to satisfy a threshold (e.g., based on CSI-RS measurement(s), SCI-2 340 decoding, etc.), then the UE 115c may generate a beam failure indication (BFI) to the medium access layer (MAC) layer (e.g. layer 2) of the UE 115c. The UE 115c may transmit the BFI to the UE 115a over a signal transmitted from the UE 115c to the UE 115a. For example, the UE 115c may transmit the BFI to the UE 115a over a beacon signal 320, a PSSCH, a PSCCH, a PBSCH, or a combination thereof.

In some aspects, the UE 115a may transmit a plurality of periodic beacon signals 320 as indicated by arrows 350 and 352. The UE 115a may transmit the plurality of periodic beacon signals 320 in a plurality of beam directions in addition to beam 312. In some instances, each of the beacon signals 320 may be transmitted in a different beam direction. For example, and without limitation, the UE 115a may transmit four beacon signals 320. Each of the four beacon signals may be transmitted about ninety degrees from the adjacent beam directions. The DMTC configuration may include time/frequency resource information (e.g., pointers to resource blocks) associated with each of the beacon signals 320. The DMTC configuration may further include beam direction information (e.g., a beam direction index, a beam direction codebook) associated with each of the different beacon signals 320. The UE 115c may perform beam sweeping to monitor for each of the different beacon signals 320. The UE 115c may measure the quality of the different received beacon signals 320. For example, the UE 115c may have an established beamformed link over a first directional beam 312 from the UE 115a. However, due to channel conditions and/or relative positions of the UE 115a and the UE 115c (e.g., due to movement of the UE 115a and/or the UE 115c and/or movement of interfering structure/device(s) between the UE 115a and the UE 115c), the UE 115c may measure a higher quality channel over a different directional beam (e.g., a second directional beam different than the first directional beam 312). The UE 115c may transmit a CSI report to the UE 115a indicating a higher channel quality over the different directional beam. The UE 115a and the UE 115c may reestablish an RRC connection via the different directional beam based on the CSI report.

Figure 4B:
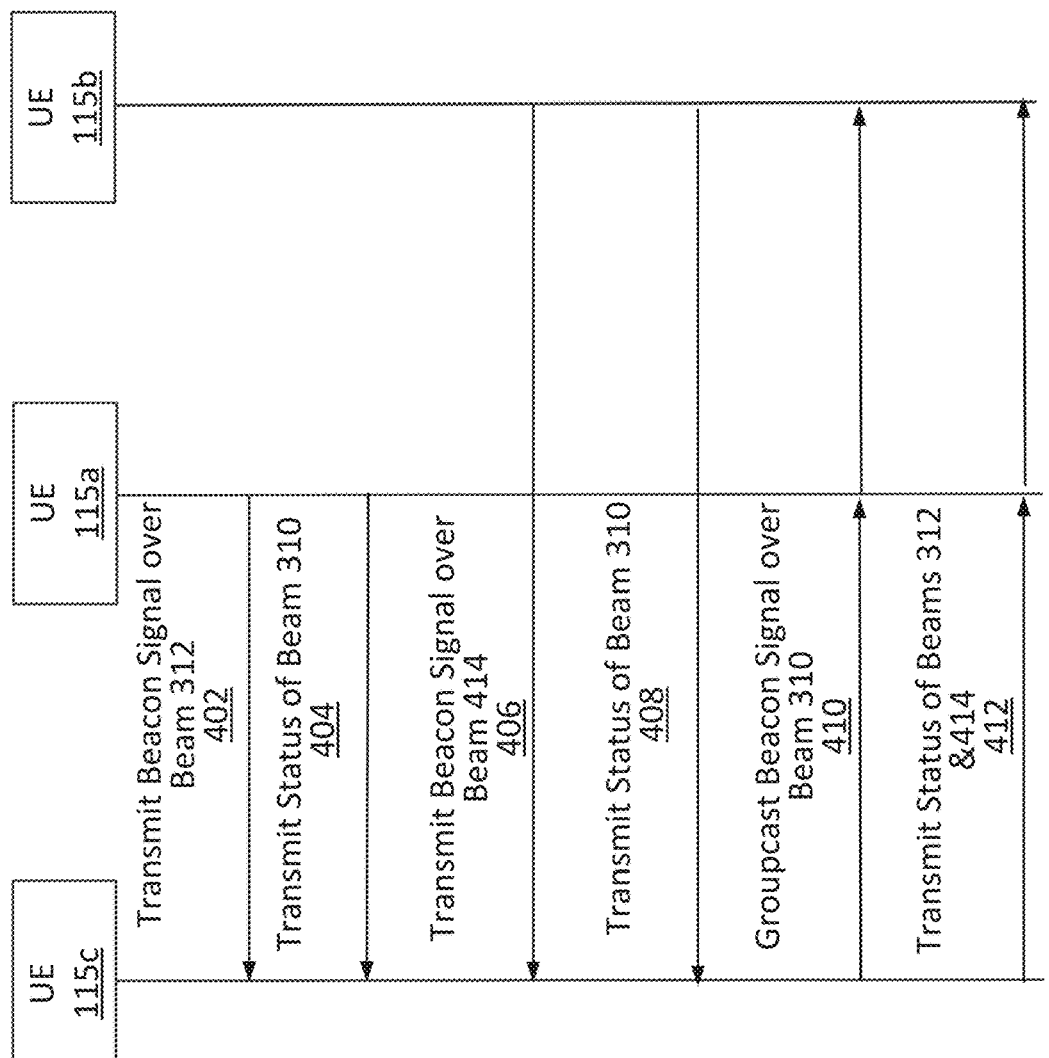
FIG. 4B illustrates a signaling diagram of a communication method according to some aspects of the present disclosure.
Figure 4A:
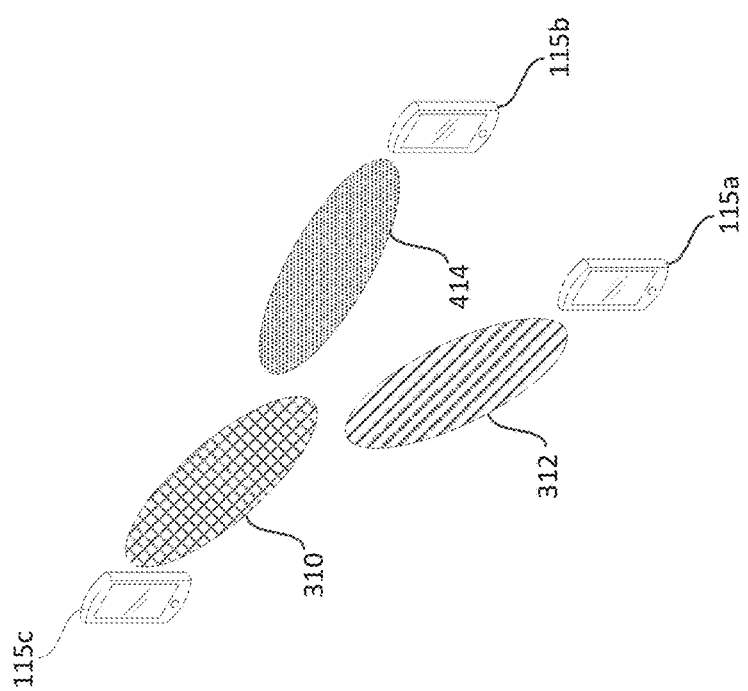
FIG. 4A illustrates multiple established beamformed links according to some aspects of the present disclosure.

FIG. 4A illustrates beamformed links between the UE 115c and the UEs 115a and 115b according to some aspects of the present disclosure. The UEs 115a, 115b, and 115c may be sidelink UEs. In this regard, the UEs 115a and 115b may establish a radio resource control (RRC) connection with the UE 115c. In some instances, the UEs 115a and 115b may establish a PC5-RRC connected mode state with the UE 115c. The PC5-RRC connected state may enable exchanging of access-stratum level information for alignment between the UE 115c and the UEs 115a and 115b to support SL unicast communications. The unicast communications may be one-to-one communications between the UE 115c and each of the UEs 115a and 115b. In some aspects, the UE 115c may have multiple PC5-RRC connections with multiple UEs for unicast communications between the UE 115c and the multiple UEs. For example, referring to FIGS. 1, 2, 3A, 4A, and/or 5A, the UE 115c may have a PC5-RRC connection with the UE 115a and the UE 115b.

The established link may be a beamformed link. For example, the beam 310 associated with the UE 115c and the beam 312 associated with the UE 115a may create a beamformed link. The beam 310 associated with the UE 115c and the beam 414 associated with the UE 115b may create a beamformed link. The beamformed link may be a directional link established by one more directional antennas in each of the UE 115a, the UE 115b, and the UE 115c. The beamformed link may enable higher data rates for longer distances compared to non-beamformed links using omnidirectional antennas. The beamformed link may compensate for pathloss at higher frequencies (e.g., FR2, FR2x frequencies). As beamforming enables directional transmission between the UE 115c and the UEs 115a and 115b, the beamformed link between the UE 115c and the UEs 115a and 115b may allow for spatial reuse of available resources due to reduced interference among the links between the UEs 115a, 115b, and the UE 115c according to some aspects of the present disclosure.

FIG. 4B illustrates a signaling diagram of a communication method according to some aspects of the present disclosure. In some aspects, the UE 115c may have multiple established links with a group of UEs (e.g., the UEs 115a and 115b) over beamformed links. In this case, the UE 115c may not transmit a separate beacon signal to each of the UEs in the group. Instead, the UE 115c may transmit the beacon signal in a single groupcast transmission to the group of UEs. For example, the destination ID in the SCI-2 associated with the beacon signal may be a groupcast destination ID that identifies the group of UEs. The groupcast beacon signal may reduce communication overhead as compared to multiple unicast transmissions to each UE in the group.

At action 402, the UE 115a may transmit a beacon signal to the UE 115c. The UE 115a may transmit the beacon signal via a PSSCH over beam 312.

At action 404, the UE 115a may transmit the status of beam 310 to the UE 115c. The UE 115a may transmit the status as a CSI report associated with a beacon signal received over beam 310. The UE 115a may transmit the status via a PSSCH over beam 312.

At action 406, the UE 115b may transmit a beacon signal to the UE 115c. The UE 115b may transmit the beacon signal via a PSSCH over beam 414.

At action 408, the UE 115b may transmit the status of beam 310 to the UE 115c. The UE 115b may transmit the status as a CSI report associated with a beacon signal received over beam 310. The UE 115b may transmit the status via a PSSCH over beam 414.

At action 410, the UE 115c may transmit a groupcast beacon signal over beam 310. In some aspects, the UE 115c may have multiple established links with the UEs 115a and 115b. In this case, the UE 115c may not transmit a separate beacon signal to each of the UEs 115a and 115b. Instead, the UE 115c may transmit the beacon signal in a single groupcast transmission to the UEs 115a and 115b. For example, the destination ID in the SCI-2 associated with the beacon signal may be a groupcast destination ID that identifies a group of UEs (e.g., the UEs 115a and 115b). The groupcast beacon signal may reduce communication overhead as compared to multiple unicast transmissions to each UE in the group (e.g., the UEs 115a and 115b).

At action 412, the UE 115c may transmit the status of the beam 312 to the UE 115a and transmit the status of the beam 414 to the UE 115b. The UE 115c may transmit the status of the beam 312 as a CSI report associated with a beacon signal received at action 402. The UE 115c may transmit the status of the beam 414 as a CSI report associated with a beacon signal received at action 406. The UE 115c may transmit the status of the beams 312 and 414 via a PSSCH.

FIG. 5A illustrates a beamformed link between the UE 115a and the UE 115c according to some aspects of the present disclosure. The UE 115a and the UE 115b may be sidelink UEs. In this regard, the UE 115a may establish a radio resource control (RRC) connection with the UE 115c. In some instances, the UE 115a may establish a PC5-RRC connected mode state with the UE 115c. The PC5-RRC connected state may enable exchanging of access-stratum level information for alignment between the UE 115a (e.g., a transmitting UE) and the UE 115c (e.g., a receiving UE) to support SL unicast communications. The unicast communications may be one-to-one communications between the UE 115a and the UE 115c. In some aspects, the UE 115a may have multiple PC5-RRC connections with multiple UEs for unicast communications between the UE 115a and the multiple UEs. For example, referring to FIGS. 1, 2, 3A, 4A, and/or 5A, the UE 115c may have a PC5-RRC connection with the UE 115a and the UE 115c.

FIG. 5B illustrates resources associated with a beacon signal according to some aspects of the present disclosure. In FIG. 5B, the x-axis represents time in some arbitrary units and the Y-axis represents frequency in some arbitrary units. The UE 115a may transmit a periodic discovery and measurement timing (DMTC) configuration via the established link to the UE 115c. The UE 115a may transmit the periodic DMTC configuration via a beamformed link with the UE 115c. In this regard, the UE 115a may transmit the DMTC configuration to the UE 115c via a PSSCH, a physical sidelink control channel (PSCCH), or other suitable channel. The DMTC configuration may include parameters to enable the UE 115a and/or the UE 115c to measure and report the status of the beamformed links corresponding to beams 310 and 312.

In some aspects, the UE 115c may refrain from transmitting the periodic beacon signal 320 within a time period after a number of successful communications between the UE 115c and the UE 115a satisfies a threshold. The beacon signal 320 may be used to determine a status of the beamformed link between the UE 115c and the UE 115a. Additionally or alternatively, the status of the beamformed link may be determined based on a sequence of successful transmissions between the UE 115c and the UE 115a. For example, the UE 115c may transmit a sequence of transport blocks (TBs) to the UE 115a via the beamformed link. If the TBs are successfully received by the UE 115a, as indicated by an ACK 512 being transmitted from the UE 115a to the UE 115c in response to each of the TBs, then the UE 115c may refrain from transmitting the beacon signal(s) for a time period (e.g., a DMTC transmission period, 10 ms, 20 ms, 40 ms, 80 ms, or 160 ms) as the successful transmission of the TBs is an indication of the quality of the beamformed link. In some aspects, the UE 115c may be configured to transmit the beacon signal 320 when the numConsecutiveDTX satisfies a threshold (e.g., number of NACKs 510 is greater than a threshold). In some aspects, the UE 115c may be configured to transmit the beacon signal 320 when the sl-maxnumConsecutiveDTXForDMTC is greater than a threshold. The UE 115c may transmit an indicator indicating to the UE 115a that the next scheduled beacon signal 320 will be skipped. For example, the UE 115c may transmit a code point in the SCI-1 indicating to the UE 115a that the next scheduled beacon signal 320 will be skipped, for example, when the numConsecutiveDTX is less than a threshold.

As shown in FIG. 5B, the numConsecutiveDTX may be incremented by one when a HARQ NACK 510 indicates an unsuccessful reception of a TB by the UE 115a. Conversely, the numConsecutiveDTX may be decremented by one when a HARQ ACK 512 indicates a successful reception of a TB by the UE 115a. When the numConsecutiveDTX is greater than a threshold of zero, the UE 115c may transmit the beacon signal 320 as indicated by arrows 514. When the numConsecutiveDTX satisfies the threshold of zero, the UE 115c may skip transmitting the beacon signal 320 as indicated by arrow 516.

Figure 6:
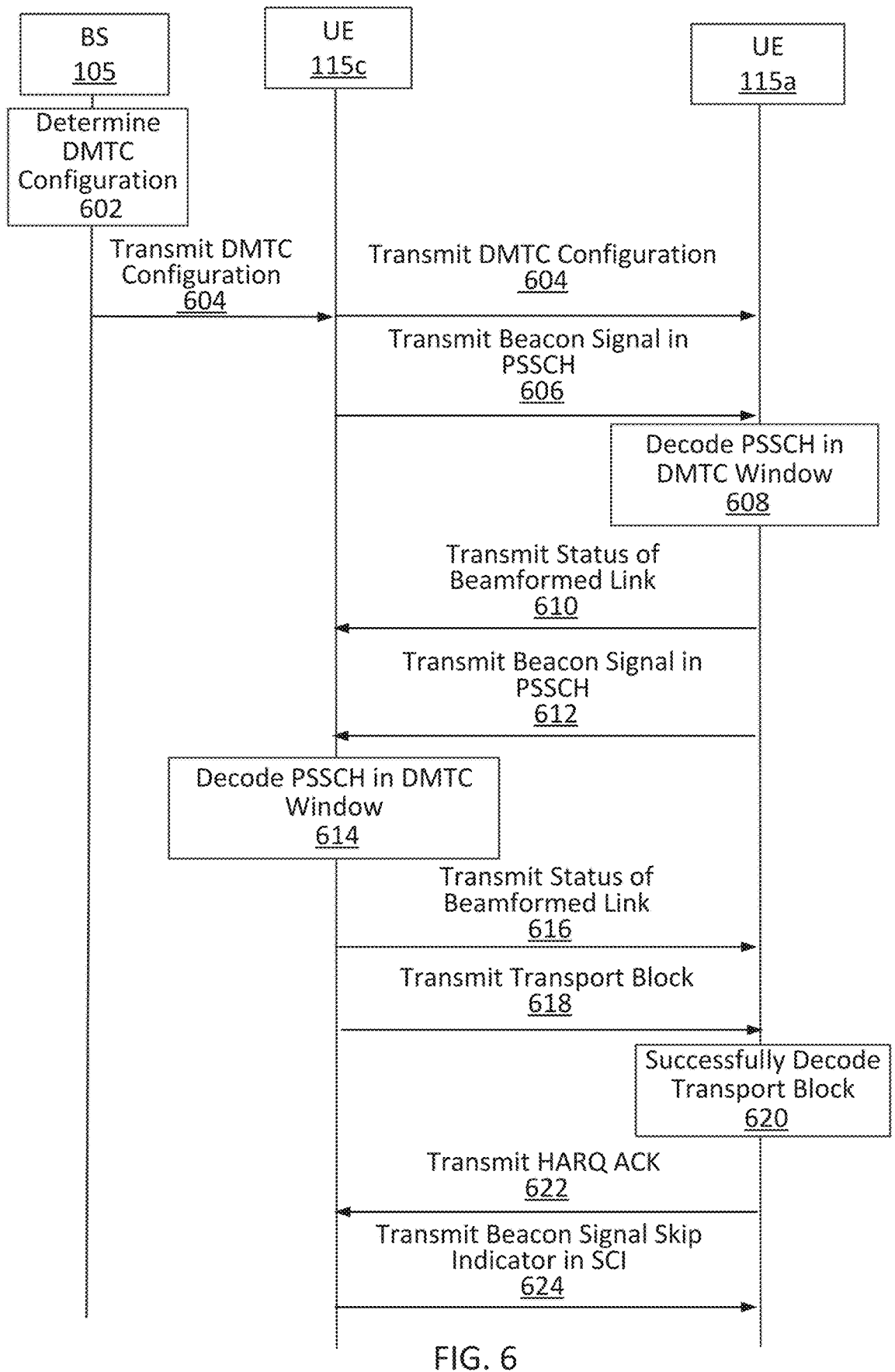
FIG. 6 is a signaling diagram of a communication method according to some aspects of the present disclosure.

FIG. 6 illustrates a signaling diagram of a communication method according to some aspects of the present disclosure. At action 602, the BS 105 may determine a DMTC configuration for the UEs 115c and 115a. In this regard, the BS 105 may determine the DMTC configuration to enable the UE 115a and the UE 115c to measure and report the status of a beamformed link between the UE 115a and the UE 115c. The DMTC configuration may specify values for DMTC parameters defining beacon signal transmission timing and resources. The specified values may define periodic DMTC occasions that include periodic beacon signal transmission windows for beacon signal transmissions from the UE 115c to the UE 115a. The DMTC configuration may include the beacon signal periodicity and/or the time/frequency resources associated with a DMTC resource window.

At action 604, the BS 105 may transmit the DMTC configuration to the UE 115c. In this regard, the BS 105 may transmit the DMTC configuration to the UE 115c via a configured grant and/or downlink control information (DCI).

At action 605, the UE 115c may transmit the DMTC configuration to the UE 115a. In this regard, the UE 115c may transmit the DMTC configuration to the UE 115a via a physical sidelink shared channel (PSSCH), a physical sidelink control channel (PSCCH), or other suitable channel.

At action 606, the UE 115c may transmit a beacon signal to the UE 115a. In this regard, the UE 115c may transmit the beacon signal to the UE 115a via a physical sidelink shared channel (PSSCH), a physical sidelink control channel (PSCCH), or other suitable channel.

At action 608, the UE 115a may decode the PSSCH carrying the beacon signal in a DMTC window. The DMTC window may include a set of time and frequency resources in which the beacon signal can be transmitted. For example, the DMTC resource window may include a set of resource elements (REs). The set of REs may include time resources (e.g., symbols, slots, sub-slots) and frequency resources (e.g., frequency subcarriers, frequency bands, frequency ranges). The UE 115c may transmit the beacon signal in a subset of REs in the DMTC resource window at action 606. The DMTC configuration received by the UE 115a at action 605 may indicate the REs defining the DMTC resource window and/or the subset of REs carrying the beacon signal. In some aspects, the UE 115a may search and/or monitor the entire DMTC resource window (e.g., all REs, symbols, slots, and/or frequency subcarriers within the DMTC window) for the beacon signal.

At action 610, the UE 115a may transmit the status of the beamformed link to the UE 115c. In this regard, the status of the beacon signal may include, without limitation, a channel quality indicator (CQI), a reference signal received power (RSRP), a reference signal received quality (RSRQ), a signal to interference and noise ratio (SINR), and/or a rank indicator (RI).

At action 612, the UE 115a may transmit a beacon signal to the UE 115c. In this regard, the UE 115a may transmit the beacon signal to the UE 115c via a physical sidelink shared channel (PSSCH), a physical sidelink control channel (PSCCH), or other suitable channel. In some aspects, the UE 115a may perform any or all of the actions executed by the UE 115c. In other words, the UE 115a may transmit a DMTC configuration and/or a beacon signal over the beamformed link to the UE 115c. The UE 115c may measure the quality of the beacon signal and transmit a CSI report to the UE 115a. In this fashion, the UE 115a and the UE 115c may determine the quality of the bidirectional communication link. The UE 115c may transmit a beacon signal to the UE 115a and the UE 115a may transmit a different beacon signal to the UE 115c in a bidirectional fashion. The bidirectional beacon signals between the UE 115c and the UE 115a may further include control elements for managing the beamformed link.

At action 614, the UE 115c may decode the PSSCH carrying the beacon signal in a DMTC window. The DMTC configuration received by the UE 115c at action 604 may indicate the REs defining the DMTC resource window and/or the subset of REs carrying the beacon signal. In some aspects, the UE 115c may search and/or monitor the entire DMTC resource window (e.g., all REs, symbols, slots, and/or frequency subcarriers within the DMTC window) for the beacon signal.

At action 616, the UE 115c may transmit the status of the beamformed link to the UE 115a. In this regard, the status of the beacon signal may include, without limitation, a channel quality indicator (CQI), a reference signal received power (RSRP), a reference signal received quality (RSRQ), a signal to interference and noise ratio (SINR), and/or a rank indicator (RI).

At action 618, the UE 115c may transmit one or more transport blocks to the UE 115a. In this regard, the UE 115c may transmit the one or more transport blocks to the UE 115a in one or more PSSCHs.

At action 620, the UE 115a may successfully decode the one or more transport blocks carried by the one or more PSSCHs.

At action 622, the UE 115a may transmit one or more HARQ ACK messages to the UE 115c. In this regard, the UE 115a may transmit a HARQ ACK message to the UE 115c via a physical sidelink feedback channel (PSFCH).

At action 624, the UE 115c may transmit a beacon signal skip indicator to the UE 115a. In this regard, the UE 115c may transmit an indicator indicating to the UE 115a that the next scheduled beacon signal will be skipped. For example, the UE 115c may transmit a code point in an SCI-1 indicating to the UE 115a that the next scheduled beacon signal will be skipped. The beacon signal skip indicator may be transmitted based on the UE 115c receiving one or more HARQ ACK messages at action 622 indicating the quality of the beamformed link between the UE 115c and the UE 115a to be acceptable and a beacon signal is not required for a time period.

Figure 7:
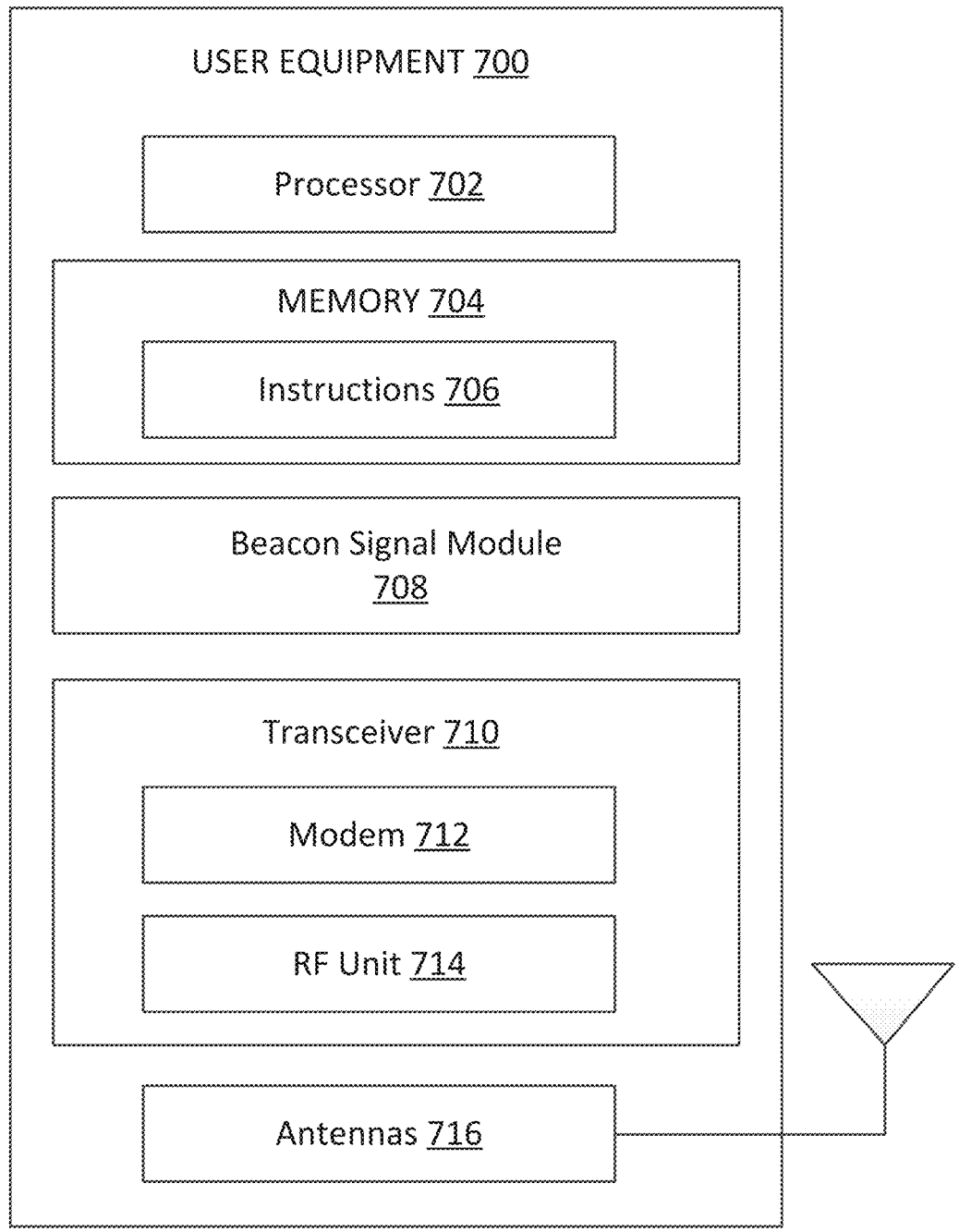
FIG. 7 is a block diagram of an exemplary user equipment (UE) according to some aspects of the present disclosure.

FIG. 7 is a block diagram of an exemplary UE 700 according to some aspects of the present disclosure. The UE 700 may be the UE 115 in the network 100 or 200 as discussed above. As shown, the UE 700 may include a processor 702, a memory 704, a beacon signal module 708, a transceiver 710 including a modem subsystem 712 and a radio frequency (RF) unit 714, and one or more antennas 716. These elements may be coupled with each other and in direct or indirect communication with each other, for example via one or more buses.

The processor 702 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 704 includes a non-transitory computer-readable medium. The memory 704 may store instructions 706. The instructions 706 may include instructions that, when executed by the processor 702, cause the processor 702 to perform the operations described herein with reference to the UEs 115 in connection with aspects of the present disclosure, for example, aspects of FIGS. 2-6 and 9-10. Instructions 706 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The beacon signal module 708 may be implemented via hardware, software, or combinations thereof. For example, the beacon signal module 708 may be implemented as a processor, circuit, and/or instructions 706 stored in the memory 704 and executed by the processor 702.

In some aspects, the beacon signal module 708 is configured to transmit and/or receive a beacon signal via a physical sidelink shared channel (PSSCH). The UE receiving the beacon signal may measure aspects of the beacon signal to determine the status (e.g., quality status) of the beamformed link. The status of the beacon signal may include, without limitation, a channel quality indicator (CQI), a reference signal received power (RSRP), a reference signal received quality (RSRQ), a signal to interference and noise ratio (SINR), and/or a rank indicator (RI). In some aspects, the beacon signal may be used by other UEs to discover neighboring UEs. The beacon signal carried by the PSSCH may include information to assist RF discovery by a third UE.

As shown, the transceiver 710 may include the modem subsystem 712 and the RF unit 714. The transceiver 710 can be configured to communicate bi-directionally with other devices, such as the BSs 105 and/or the UEs 115. The modem subsystem 712 may be configured to modulate and/or encode the data from the memory 704 and the beacon signal module 708 according to a modulation and coding scheme (MCS), e.g., a low-density parity check (LDPC) coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 115 or a BS 105. The RF unit 714 may be further configured to perform analog beamforming in conjunction with the digital beamforming. Although shown as integrated together in transceiver 710, the modem subsystem 712 and the RF unit 714 may be separate devices that are coupled together to enable the UE 700 to communicate with other devices.

The RF unit 714 may provide the modulated and/or processed data, e.g. data packets (or, more generally, data messages that may contain one or more data packets and other information), to the antennas 716 for transmission to one or more other devices. The antennas 716 may further receive data messages transmitted from other devices. The antennas 716 may provide the received data messages for processing and/or demodulation at the transceiver 710. The antennas 716 may include multiple antennas of similar or different designs in order to sustain multiple transmission links. The RF unit 714 may configure the antennas 716.

In some instances, the UE 700 can include multiple transceivers 710 implementing different RATs (e.g., NR and LTE). In some instances, the UE 700 can include a single transceiver 710 implementing multiple RATs (e.g., NR and LTE). In some instances, the transceiver 710 can include various components, where different combinations of components can implement RATs.

In some aspects, the processor 702 may be coupled to the memory 704, the beacon signal module 708, and/or the transceiver 710. The processor 702 and may execute operating system (OS) code stored in the memory 704 in order to control and/or coordinate operations of the beacon signal module 708 and/or the transceiver 710. In some aspects, the processor 702 may be implemented as part of the beacon signal module 708.

Figure 8:
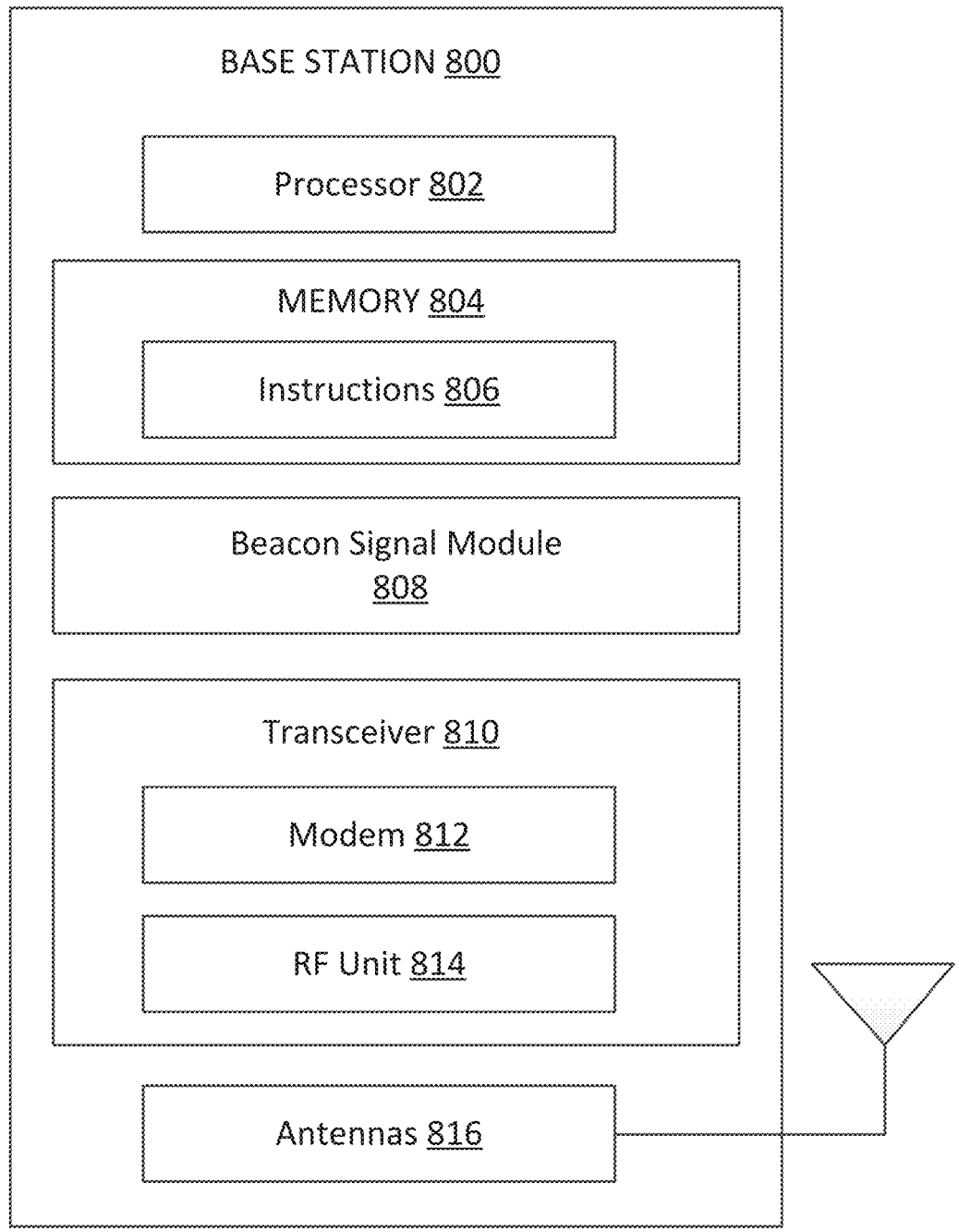
FIG. 8 is a block diagram of an exemplary base station (BS) according to some aspects of the present disclosure.

FIG. 8 is a block diagram of an exemplary BS 800 according to some aspects of the present disclosure. The BS 800 may be a BS 105 as discussed above. As shown, the BS 800 may include a processor 802, a memory 804, a beacon signal module 808, a transceiver 810 including a modem subsystem 812 and a RF unit 814, and one or more antennas 816. These elements may be coupled with each other and in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 2-6 and 9-10. Instructions 806 may also be referred to as code, which may be interpreted broadly to include any type of computer-readable statement (s).

The beacon signal module 808 may be implemented via hardware, software, or combinations thereof. For example, the beacon signal module 808 may be implemented as a processor, circuit, and/or instructions 806 stored in the memory 804 and executed by the processor 802.

The beacon signal module 808 may be used for various aspects of the present disclosure, for example, aspects of FIGS. 2-6 and 9-10. In some aspects, the beacon signal module 708 is configured to determine a DMTC configuration and transmit the DMTC configuration to a UE (e.g., the UE 115 or 700).

Additionally or alternatively, the beacon signal module 808 can be implemented in any combination of hardware and software, and may, in some implementations, involve, for example, processor 802, memory 804, instructions 806, transceiver 810, and/or modem 812.

As shown, the transceiver 810 may include the modem subsystem 812 and the RF unit 814. The transceiver 810 can be configured to communicate bi-directionally with other devices, such as the UEs 115 and/or 800. The modem subsystem 812 may be configured to modulate and/or encode data according to a MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data from the modem subsystem 812 (on outbound transmissions) or of transmissions originating from another source such as a UE 115 or UE 700. The RF unit 814 may be further configured to perform analog beamforming in conjunction with the digital beamforming. Although shown as integrated together in transceiver 810, the modem subsystem 812 and/or the RF unit 814 may be separate devices that are coupled together at the BS 800 to enable the BS 800 to communicate with other devices.

The RF unit 814 may provide the modulated and/or processed data, e.g. data packets (or, more generally, data messages that may contain one or more data packets and other information), to the antennas 816 for transmission to one or more other devices. This may include, for example, a configuration indicating a plurality of sub-slots within a slot according to aspects of the present disclosure. The antennas 816 may further receive data messages transmitted from other devices and provide the received data messages for processing and/or demodulation at the transceiver 810. The antennas 816 may include multiple antennas of similar or different designs in order to sustain multiple transmission links.

In some instances, the BS 800 can include multiple transceivers 810 implementing different RATs (e.g., NR and LTE). In some instances, the BS 800 can include a single transceiver 810 implementing multiple RATs (e.g., NR and LTE). In some instances, the transceiver 810 can include various components, where different combinations of components can implement RATs.

In some aspects, the processor 802 may be coupled to the memory 804, the beacon signal module 808, and/or the transceiver 810. The processor 802 may execute OS code stored in the memory 804 to control and/or coordinate operations of the beacon signal module 808, and/or the transceiver 810. In some aspects, the processor 802 may be implemented as part of the beacon signal module 808. In some aspects, the processor 802 is configured to transmit via the transceiver 810, to a UE, an indicator indicating a configuration of sub-slots within a slot.

Figure 9:
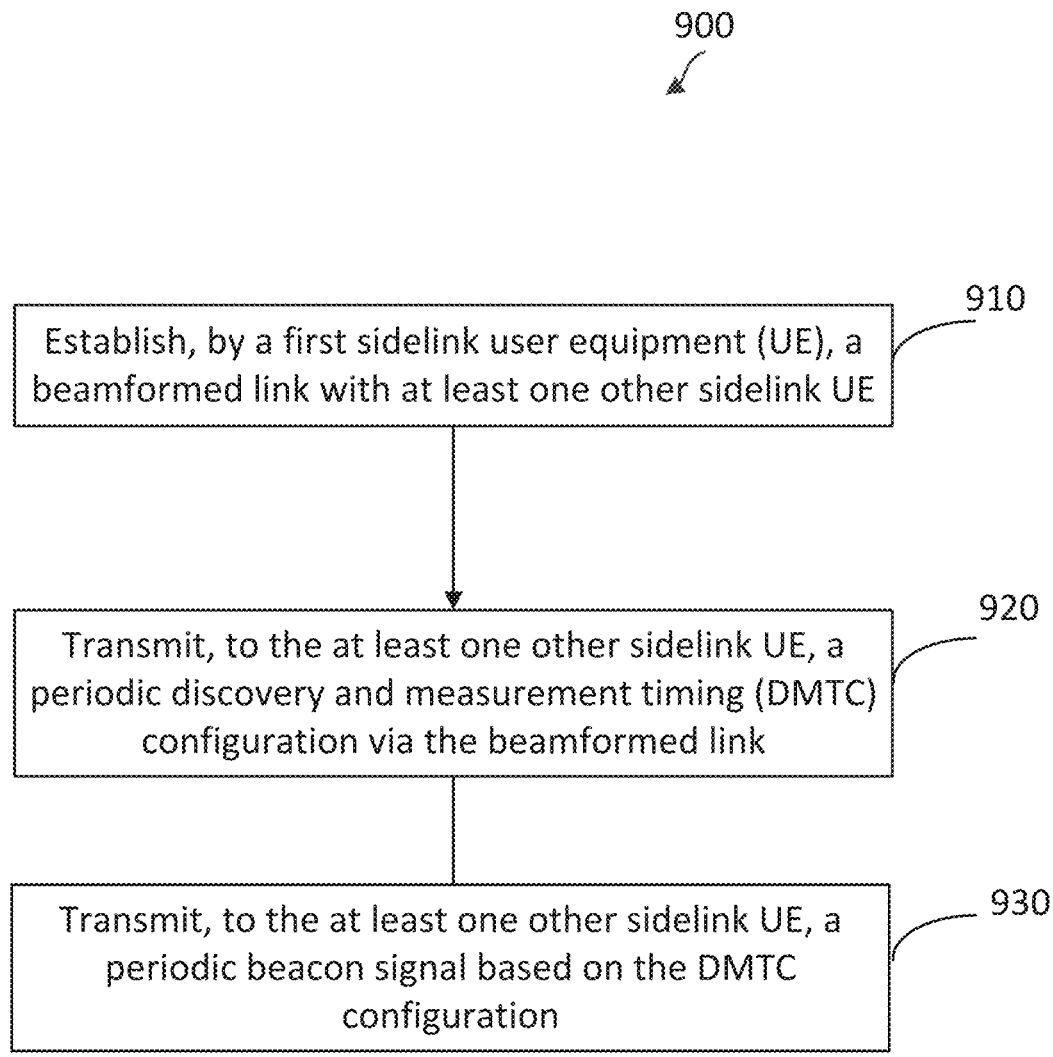
FIG. 9 is a flow diagram of a communication method according to some aspects of the present disclosure.

FIG. 9 is a flow diagram of a communication method 900 according to some aspects of the present disclosure. Aspects of the method 900 can be executed by a computing device (e.g., a processor, processing circuit, and/or other suitable component) of a wireless communication device or other suitable means for performing the actions. For example, a wireless communication device, such as the UE 115 or UE 700, may utilize one or more components, such as the processor 702, the memory 704, the beacon signal module 708, the transceiver 710, the modem 712, and the one or more antennas 716, to execute aspects of method 900. The method 900 may employ similar mechanisms as in the networks 100 and 200 and the aspects and actions described with respect to FIGS. 2-6. As illustrated, the method 900 includes a number of enumerated actions, but the method 900 may include additional actions before, after, and in between the enumerated actions. In some aspects, one or more of the enumerated actions may be omitted or performed in a different order.

At action 910, the method 900 includes a first sidelink UE (e.g., the UE 115 or the UE 700) establishing a link with a second sidelink UE. In this regard, the first UE may establish a radio resource control (RRC) connection with the second sidelink UE. In some instances, the first UE may establish a PC5-RRC connected mode state with the second UE. The PC5-RRC connected state may enable exchanging of access-stratum level information for alignment between the first UE (e.g., a transmitting UE) and the second UE (e.g., a receiving UE) to support SL unicast communications. The unicast communications may be one-to-one communications between the first UE and the second UE. In some aspects, the first UE may have multiple PC5-RRC connections with multiple UEs for unicast communications between the first UE and the multiple UEs. For example, referring to FIGS. 1, 2, and/or 4a, the UE 115c may have a PC5-RRC connection with the UE 115a and the UE 115c.

The established link may be a beamformed link. The beamformed link may be a directional link established by one more directional antennas in each of the first UE and the second UE. The beamformed link may enable higher data rates for longer distances compared to non-beamformed links using omni-directional antennas. The beamformed link may compensate for pathloss at higher frequencies (e.g., FR2, FR2x frequencies). As beamforming enables directional transmission between the first UE and the second UE, the beamformed link between the first UE and the second UE may allow for spatial reuse of available resources due to reduced interference among the UEs.

At action 920, the method 900 includes the first UE transmitting a periodic discovery and measurement timing (DMTC) configuration via the established link to the second sidelink UE. The first UE may transmit the periodic DMTC configuration via a beamformed link with the second sidelink UE. In this regard, the first UE may transmit the DMTC configuration to the second UE via a physical sidelink shared channel (PSSCH), a physical sidelink control channel (PSCCH) or other suitable channel. The DMTC configuration may include parameters to enable the first and/or second UEs to measure and report the status of the beamformed link. The DMTC configuration may specify values for DMTC parameters defining beacon signal transmission timing and resources. The specified values may define periodic DMTC occasions that include periodic beacon signal transmission windows for beacon signal transmissions from the first UE to the second UE. The DMTC configuration may include the beacon signal periodicity and/or the time/frequency resources associated with a DMTC resource window. When operating in sidelink mode 1, the first UE may receive the DMTC configuration from a BS (e.g., the BS 105 or the BS 800). In this regard the first UE may receive the DMTC configuration from the BS in a configured grant. The first UE may transmit (e.g., forward) the DMTC configuration received from the BS to the second UE. When operating in sidelink mode 2, the first UE may determine the DMTC configuration. The first UE may transmit the DMTC configuration to the second UE in a configured grant. The DMTC configuration may enable beamformed radio link failure detection by the receiving UE.

At action 930, the method 900 includes the first UE transmitting a periodic beacon signal to the second sidelink UE based on the DMTC configuration. In this regard, the first UE may transmit the beacon signal to the second UE via a physical sidelink shared channel (PSSCH). The second UE may measure aspects of the beacon signal to determine the status (e.g., quality status) of the beamformed link. The status of the beacon signal may include, without limitation, a channel quality indicator (CQI), a reference signal received power (RSRP), a reference signal received quality (RSRQ), a signal to interference and noise ratio (SINR), and/or a rank indicator (RI). In some aspects, the beacon signal may be used by other UEs to discover neighboring UEs. The beacon signal carried by the PSSCH may include information to assist RF discovery by a third UE. The beacon signal may be received by the third UE and indicate the DMTC of the second UE or any other UE that the first UE has a unicast connection with. For example, the beacon signal may include the layer 2 ID of all UEs that the first UE has a unicast connection with and their corresponding DMTCs. A third UE may determine that the first UE is within the vicinity of the second UE based on receiving the DMTC of the second UE.

The first UE may transmit the beacon signal within the DMTC resource window. The DMTC window may include a set of time and frequency resources in which the beacon signal can be transmitted. For example, the DMTC resource window may include a set of resource elements (REs). The set of REs may include time resources (e.g., symbols, slots, sub-slots) and frequency resources (e.g., frequency subcarriers, frequency bands, frequency ranges). The first UE may transmit the beacon signal in a subset of REs in the DMTC resource window. The DMTC configuration received by the second UE (e.g., from the first UE and/or a BS) may indicate the REs defining the DMTC resource window and/or the subset of REs carrying the beacon signal. In some aspects, the second UE may search and/or monitor the entire DMTC resource window (e.g., all REs, symbols, slots, and/or frequency subcarriers within the DMTC window) for the beacon signal carried by the PSSCH in a subset of REs of the DMTC resource window.

The first UE may transmit the beacon signal according to a DMTC transmission periodicity, for example, at about 10 ms, 20 ms, 40 ms, 80 ms, 160 ms, or any suitable periodicity. In some aspects, the beacon signal may include a sidelink channel state information-reference signal (CSI-RS). The second UE may use the received CSI-RS to determine the status (e.g., the quality) of the beamformed link. The status of the beacon signal may include, without limitation, a channel quality indicator (CQI), a reference signal received power (RSRP), a reference signal received quality (RSRQ), a signal to interference and noise ratio (SINR), and/or a rank indicator (RI).

The second UE may generate a CSI report describing the quality of the beamformed link. The CSI report may include information related to the channel conditions in the beamformed link between the first UE and the second UE. For example, the CSI report may include a channel quality indicator (CQI), a reference signal received power (RSRP), a reference signal received quality (RSRQ), a signal to interference and noise ratio (SINR), and/or a rank indicator (RI).

In some aspects, the beacon signal may include second-stage sidelink control information (SCI-2). Additionally or alternatively, the second UE may determine the status of the beamformed link based upon decoding the SCI-2. For example, if the second UE successfully decodes the SCI-2, the second UE may determine the quality of the beamformed link to be acceptable. However, if the second UE is unable to successfully decode the SCI-2, the second UE may determine the quality of the beamformed link to be unacceptable.

If the quality of the beacon signal fails to satisfy a threshold (e.g., based on CSI-RS measurement(s), SCI-2 decoding, etc.), then the second UE may generate a beam failure indication (BFI) to the medium access layer (MAC) layer (e.g. layer 2) of the second UE. The second UE may transmit the BFI to the first UE over a signal transmitted from the second UE to the first UE. For example, the second UE may transmit the BFI to the first UE over a beacon signal, a PSSCH, a PSCCH, a PBSCH, or a combination thereof.

In some aspects, the first UE may transmit a plurality of periodic beacon signals. The first UE may transmit the plurality of periodic beacon signals in a plurality of beam directions. In some instances, each of the beacon signals may be transmitted in a different beam direction. For example, and without limitation, the first UE may transmit four beacon signals. Each of the four beacon signals may be transmitted about ninety degrees from the adjacent beam directions. The DMTC configuration may include time/frequency resource information (e.g., pointers to resource blocks) associated with each of the beacon signals. The DMTC configuration may further include beam direction information (e.g., a beam direction index, a beam direction codebook) associated with each of the different beacon signals. The second UE may perform beam sweeping to monitor for each of the different beacon signals. The second UE may measure the quality of the different received beacon signals. For example, the second UE may have an established beamformed link over a first directional beam from the first UE. However, due to channel conditions and/or relative positions of the first and second UE (e.g., due to movement of the first and/or second UEs and/or movement of interfering structure(s) and/or device(s) between the first and second UEs), the second UE may measure a higher quality channel over a different directional beam (e.g., a second directional beam different than the first directional beam). The second UE may transmit a CSI report to the first UE indicating a higher channel quality over the different directional beam. The first and second UEs may reestablish an RRC connection via the different directional beam based on the CSI report.

In some aspects, the second UE may perform any or all of the actions 910, 920, or 930. In other words, the second UE may transmit a DMTC configuration and/or a beacon signal over the beamformed link to the first UE. The first UE may measure the quality of the beacon signal and transmit a CSI report to the second UE. In this fashion, the first and second UEs may determine the quality of the bidirectional communication link. The first UE may transmit a beacon signal to the second UE and the second UE may transmit a different beacon signal to the first UE in a bidirectional fashion. The bidirectional beacon signals between the first UE and the second UE may further include control elements for managing the beamformed link. For example, the beacon signal carried by the PSSCH may include a number of consecutive discontinuous transmissions (numConsecutiveDTX). The sidelink HARQ process may (re-)initialize numConsecutiveDTX to zero for each PC5-RRC connection that has been established between the first and second UEs. If the HARQ process of the first UE fails to receive a physical sidelink feedback channel (PSFCH) communication (e.g., an ACK or a NACK) associated with a PSSCH transmission, the numConsecutiveDTX may be incremented by 1. If the numConsecutiveDTX reaches a threshold (sl-maxnumConsecutiveDTX) the HARQ process may report a radio link failure (RLF) to the RRC.

In some aspects, the first UE may transmit multiple beacon signals to multiple UEs. The first UE may establish multiple unicast connections to multiple UEs over different beamformed links. The first UE may transmit beacon signals to each of the multiple UEs over the different beamformed links. The DMTC configuration may include pointers to the other beacon signal resources (e.g., the DMTC resource windows indicating the time/frequency resources associated with different directions for different UEs). In this manner, the second UE may measure the quality of multiple beacon signals associated with the different beamformed links intended for other UEs and transmit (e.g., report) the quality of the multiple beacon signals to the first UE in a CSI report. In this way, the second UE may switch to the beamformed link with the highest quality.

In some aspects, the first UE may have multiple established links with a group of UEs over the same beamformed link. In this case, the first UE may not transmit a separate beacon signal to each of the UEs in the group. Instead, the first UE may transmit the beacon signal in a single groupcast transmission to the group of UEs. For example, the destination ID in the SCI-2 associated with the beacon signal may be a groupcast destination ID that identifies the group of UEs. The groupcast beacon signal may reduce communication overhead as compared to multiple unicast transmissions to each UE in the group.

In some aspects, when the beamformed link between the first UE and the second UE fails, the first UE may broadcast beacon signals over multiple beam directions. In this regard, the first UE may transmit an SCI-2 with SCI format 2-A indicating the cast type as broadcast. The first UE may include a broadcast ID in the destination ID of the SCI-2. The first UE may transmit broadcast beacons in addition to the unicast beacon signals. The second UE may search for the broadcasted beacon signals by decoding the broadcast ID in the SCI-2 within the DMTC resource window. The second UE may detect one or more of the broadcasted beacons signals from the first UE. The second UE may determine the highest quality beacon signal of the one or more detected broadcast beacons signals. The second UE attempt to re-establish a beamformed link with the first UE via the beam direction associated with the highest quality beacon signal.

In some aspects, the first UE may refrain from transmitting the periodic beacon signal within a time period after a number of successful communications between the first sidelink UE and the second sidelink UE satisfies a threshold. The beacon signal may be used to determine a status of the beamformed link between the first and second UE. Additionally or alternatively, the status of the beamformed link may be determined based on a sequence of successful transmissions between the first UE and the second UE. For example, the first UE may transmit a sequence of transport blocks (TBs) to the second UE via the beamformed link. If the TBs are successfully received, as indicated by an ACK being transmitted to the first UE in response to each of the TBs, then the first UE may refrain from transmitting the beacon signal(s) for a time period (e.g., a DMTC transmission period, 10 ms, 20 ms, 40 ms, 80 ms, or 160 ms) as the successful transmission of the TBs is an indication of the quality of the beamformed link. In some aspects, the first UE may be configured to transmit the beacon signal when the numConsecutiveDTX satisfies a threshold (e.g., number of NACKs is greater than a threshold). In some aspects, the first UE may be configured to transmit the beacon signal when the sl-maxnumConsecutiveDTXForDMTC is greater than a threshold. The first UE may transmit an indicator indicating to the second UE that the next scheduled beacon signal will be skipped. For example, the first UE may transmit a code point in the SCI-1 indicating to the second UE that the next scheduled beacon signal will be skipped, for example, when the numConsecutiveDTX is less than a threshold.

Figure 10:
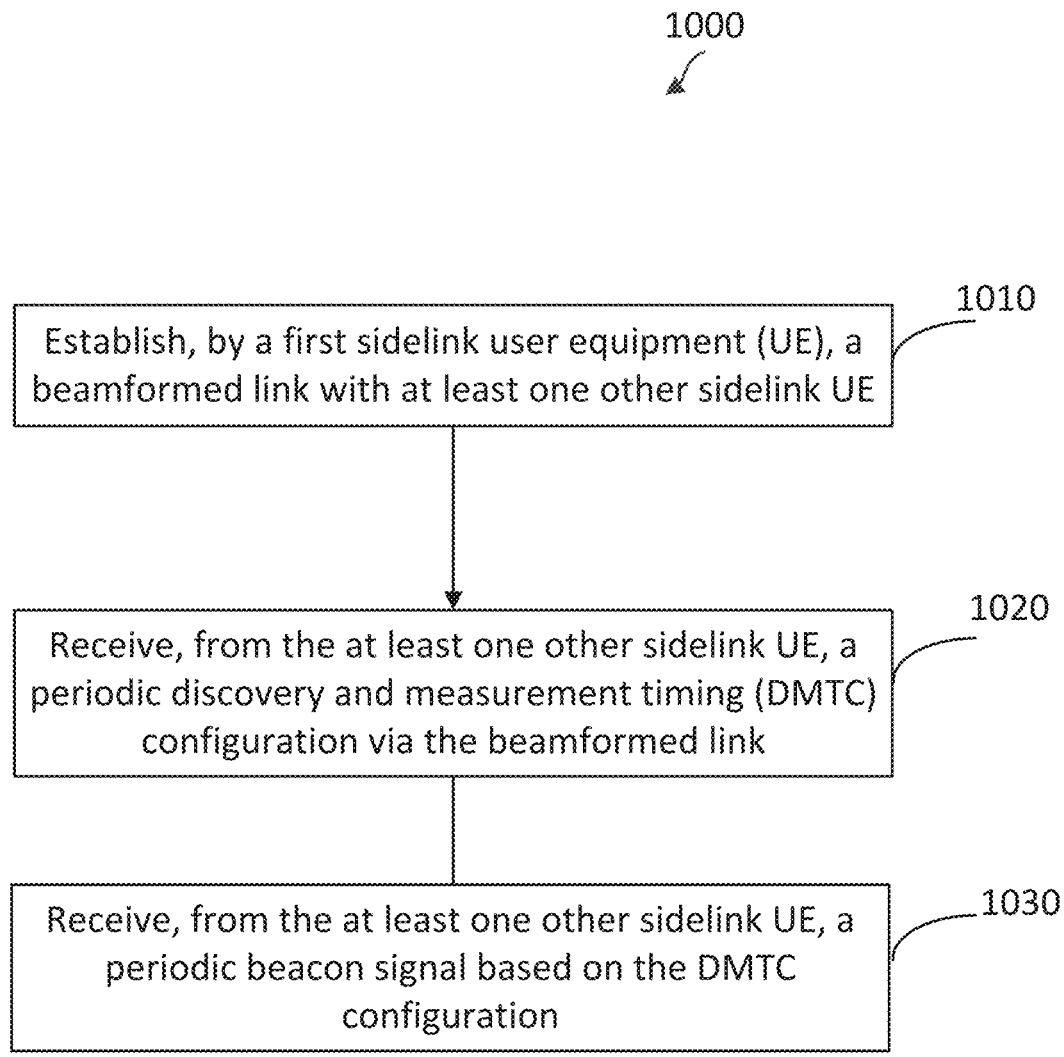
FIG. 10 is a flow diagram of a communication method according to some aspects of the present disclosure.

FIG. 10 is a flow diagram of a communication method 1000 according to some aspects of the present disclosure. Aspects of the method 1000 can be executed by a computing device (e.g., a processor, processing circuit, and/or other suitable component) of a wireless communication device or other suitable means for performing the actions. For example, a wireless communication device, such as the UE 115 or UE 700, may utilize one or more components, such as the processor 702, the memory 704, the beacon signal module 708, the transceiver 710, the modem 712, and the one or more antennas 716, to execute aspects of method 1000. The method 900 may employ similar mechanisms as in the networks 100 and 200 and the aspects and actions described with respect to FIGS. 2-6. As illustrated, the method 1000 includes a number of enumerated actions, but the method 1000 may include additional actions before, after, and in between the enumerated actions. In some aspects, one or more of the enumerated actions may be omitted or performed in a different order.

At action 1010, the method 1000 includes a first sidelink UE (e.g., the UE 115 or the UE 700) establishing a link with a second sidelink UE. In this regard, the first UE may establish a radio resource control (RRC) connection with the second sidelink UE. In some instances, the first UE may establish a PC5-RRC connected mode state with the second UE. The PC5-RRC connected state may enable exchanging of access-stratum level information for alignment between the first UE (e.g., a receiving UE) and the second UE (e.g., a transmitting UE) to support SL unicast communications. The unicast communications may be one-to-one communications between the first UE and the second UE. In some aspects, the first UE may have multiple PC5-RRC connections with multiple UEs for unicast communications between the first UE and the multiple UEs. For example, referring to FIGS. 1, 2, and/or 4a, the UE 115c may have a PC5-RRC connection with the UE 115a and the UE 115c.

The established link may be a beamformed link. The beamformed link may be a directional link established by one more directional antennas in each of the first UE and the second UE. The beamformed link may enable higher data rates for longer distances compared to non-beamformed links using omni-directional antennas. The beamformed link may compensate for pathloss at higher frequencies (e.g., FR2, FR2x frequencies). As beamforming enables directional transmission between the first UE and the second UE, the beamformed link between the first UE and the second UE may allow for spatial reuse of available resources due to reduced interference among the UEs.

At action 1020, the method 1000 includes the first UE receiving a periodic discovery and measurement timing (DMTC) configuration via the established link from the second sidelink UE. The first UE may receive the periodic DMTC configuration via a beamformed link with the second sidelink UE. In this regard, the first UE may receive the DMTC configuration from the second UE via a physical sidelink shared channel (PSSCH), a physical sidelink control channel (PSCCH) or other suitable channel. The DMTC configuration may include parameters to enable the first and/or second UEs to measure and report the status of the beamformed link. The DMTC configuration may specify values for DMTC parameters defining beacon signal transmission timing and resources. The specified values may define periodic DMTC occasions that include periodic beacon signal transmission windows for beacon signal transmissions from the second UE to the first UE. The DMTC configuration may include the beacon signal periodicity and/or the time/frequency resources associated with a DMTC resource window. When operating in sidelink mode 1, the second UE may receive the DMTC configuration from a BS (e.g., the BS 105 or the BS 800). In this regard, the second UE may receive the DMTC configuration from the BS in a configured grant. The first UE may receive the DMTC configuration from the second UE. When operating in sidelink mode 2, the second UE may determine the DMTC configuration. The second UE may transmit the DMTC configuration to the first UE in a configured grant. The DMTC configuration may enable beamformed radio link failure detection by the second UE.

At action 1030, the method 1000 includes the first UE receiving a periodic beacon signal to the second sidelink UE based on the DMTC configuration. In this regard, the first UE may receive the beacon signal from the second UE via a physical sidelink shared channel (PSSCH). The first UE may measure aspects of the beacon signal to determine the status (e.g., quality status) of the beamformed link. The status of the beacon signal may include, without limitation, a channel quality indicator (CQI), a reference signal received power (RSRP), a reference signal received quality (RSRQ), a signal to interference and noise ratio (SINR), and/or a rank indicator (RI). In some aspects, the beacon signal may be used by other UEs to discover neighboring UEs. The beacon signal carried by the PSSCH may include information to assist RF discovery by a third UE. The beacon signal may be received by the third UE and indicate the DMTC of the first UE or any other UE that the second UE has a unicast connection with. For example, the beacon signal may include the layer 2 ID of all UEs that the second UE has a unicast connection with and their corresponding DMTCs. A third UE may determine that the second UE is within the vicinity of the first UE based on receiving the DMTC of the first UE.

The first UE may receive the beacon signal within the DMTC resource window. The DMTC window may include a set of time and frequency resources in which the beacon signal can be transmitted. For example, the DMTC resource window may include a set of resource elements (REs). The set of REs may include time resources (e.g., symbols, slots, sub-slots) and frequency resources (e.g., frequency subcarriers, frequency bands, frequency ranges). The first UE may receive the beacon signal in a subset of REs in the DMTC resource window. The DMTC configuration received by the first UE (e.g., from the second UE and/or a BS) may indicate the REs defining the DMTC resource window and/or the subset of REs carrying the beacon signal. In some aspects, the first UE may search and/or monitor the entire DMTC resource window (e.g., all REs, symbols, slots, and/or frequency subcarriers within the DMTC window) for the beacon signal carried by the PSSCH in a subset of REs of the DMTC resource window.

The first UE may receive the beacon signal according to a DMTC transmission periodicity, for example, at about 10 ms, 20 ms, 40 ms, 80 ms, 160 ms, or any suitable periodicity. In some aspects, the beacon signal may include a sidelink channel state information-reference signal (CSI-RS). The first UE may use the received CSI-RS to determine the status (e.g., the quality) of the beamformed link. The status of the beacon signal may include, without limitation, a channel quality indicator (CQI), a reference signal received power (RSRP), a reference signal received quality (RSRQ), a signal to interference and noise ratio (SINR), and/or a rank indicator (RI).

The first UE may generate a CSI report describing the quality of the beamformed link. The CSI report may include information related to the channel conditions in the beamformed link between the first UE and the second UE. For example, the CSI report may include a channel quality indicator (CQI), a reference signal received power (RSRP), a reference signal received quality (RSRQ), a signal to interference and noise ratio (SINR), and/or a rank indicator (RI).

In some aspects, the beacon signal may include second-stage sidelink control information (SCI-2). Additionally or alternatively, the first UE may determine the status of the beamformed link based upon decoding the SCI-2. For example, if the first UE successfully decodes the SCI-2, the first UE may determine the quality of the beamformed link to be acceptable. However, if the first UE is unable to successfully decode the SCI-2, the first UE may determine the quality of the beamformed link to be unacceptable.

If the quality of the beacon signal fails to satisfy a threshold (e.g., based on CSI-RS measurement(s), SCI-2 decoding, etc.), then the first UE may generate a beam failure indication (BFI) to the medium access layer (MAC) layer (e.g. layer 2) of the first UE. The second UE may receive the BFI from the first UE over a signal transmitted from the first UE to the second UE. For example, the first UE may transmit the BFI to the second UE over a beacon signal, a PSSCH, a PSCCH, a PBSCH, or a combination thereof.

In some aspects, the first UE may receive a plurality of periodic beacon signals. The first UE may receive the plurality of periodic beacon signals in a plurality of beam directions. In some instances, each of the beacon signals may be received from a different beam direction. For example, and without limitation, the second UE may transmit four beacon signals. Each of the four beacon signals may be transmitted by the second UE about ninety degrees from the adjacent beam directions. The DMTC configuration may include time/frequency resource information (e.g., pointers to resource blocks) associated with each of the beacon signals. The DMTC configuration may further include beam direction information (e.g., a beam direction index, a beam direction codebook) associated with each of the different beacon signals. The first UE may perform beam sweeping to monitor for each of the different beacon signals. The first UE may measure the quality of the different received beacon signals. For example, the first UE may have an established beamformed link over a first directional beam from the second UE. However, due to channel conditions and/or relative positions of the first and second UE (e.g., due to movement of the first and/or second UEs and/or movement of interfering structure(s) and/or device(s) between the first and second UEs), the first UE may measure a higher quality channel over a different directional beam (e.g., a second directional beam different than the first directional beam). The first UE may transmit a CSI report to the second UE indicating a higher channel quality over the different directional beam. The first and second UEs may reestablish an RRC connection via the different directional beam based on the CSI report.

In some aspects, the first UE may perform any or all of the actions 910, 920, or 930. In other words, the first UE may transmit a DMTC configuration and/or a beacon signal over the beamformed link to the second UE. The second UE may measure the quality of the beacon signal and transmit a CSI report to the first UE. In this fashion, the first and second UEs may determine the quality of the bidirectional communication link. The first UE may transmit a beacon signal to the second UE and the second UE may transmit a different beacon signal to the first UE in a bidirectional fashion. The bidirectional beacon signals between the first UE and the second UE may further include control elements for managing the beamformed link. For example, the beacon signal carried by the PSSCH may include a number of consecutive discontinuous transmissions (numConsecutiveDTX). The sidelink HARQ process may (re-)initialize numConsecutiveDTX to zero for each PC5-RRC connection that has been established between the first and second UEs. If the HARQ process of the second UE fails to receive a physical sidelink feedback channel (PSFCH) communication (e.g., an ACK or a NACK) associated with a PSSCH transmission, the numConsecutiveDTX may be incremented by 1. If the numConsecutiveDTX reaches a threshold (sl-maxnumConsecutiveDTX) the HARQ process may report a radio link failure (RLF) to the RRC.

In some aspects, the first UE may receive multiple beacon signals from multiple UEs. The second UE may establish multiple unicast connections to multiple UEs over different beamformed links. The second UE may transmit beacon signals to each of the multiple UEs over the different beamformed links. The DMTC configuration may include pointers to the other beacon signal resources (e.g., the DMTC resource windows indicating the time/frequency resources associated with different directions for different UEs). In this manner, the first UE may measure the quality of multiple beacon signals associated with the different beamformed links intended for other UEs and transmit (e.g., report) the quality of the multiple beacon signals to the second UE in a CSI report. In this way, the first UE may switch to the beamformed link with the highest quality.

In some aspects, the second UE may have multiple established links with a group of UEs over the same beamformed link. In this case, the second UE may not transmit a separate beacon signal to each of the UEs in the group. Instead, the second UE may transmit the beacon signal in a single groupcast transmission to the group of UEs. For example, the destination ID in the SCI-2 associated with the beacon signal may be a groupcast destination ID that identifies the group of UEs. The groupcast beacon signal may reduce communication overhead as compared to multiple unicast transmissions to each UE in the group.

In some aspects, when the beamformed link between the first UE and the second UE fails, the second UE may broadcast beacon signals over multiple beam directions. In this regard, the second UE may transmit an SCI-2 with SCI format 2-A indicating the cast type as broadcast. The second UE may include a broadcast ID in the destination ID of the SCI-2. The second UE may transmit broadcast beacons in addition to the unicast beacon signals. The first UE may search for the broadcasted beacon signals by decoding the broadcast ID in the SCI-2 within the DMTC resource window. The first UE may detect one or more of the broadcasted beacons signals from the second UE. The first UE may determine the highest quality beacon signal of the one or more detected broadcast beacons signals. The first UE attempt to re-establish a beamformed link with the second UE via the beam direction associated with the highest quality beacon signal.

In some aspects, the second UE may refrain from transmitting the periodic beacon signal within a time period after a number of successful communications between the first sidelink UE and the second sidelink UE satisfies a threshold. The beacon signal may be used to determine a status of the beamformed link between the first and second UE. Additionally or alternatively, the status of the beamformed link may be determined based on a sequence of successful transmissions between the first UE and the second UE. For example, the first UE may receive a sequence of transport blocks (TBs) from the second UE via the beamformed link. If the TBs are successfully received, as indicated by an ACK being transmitted by the first UE to the second UE in response to each of the TBs, then the second UE may refrain from transmitting the beacon signal(s) for a time period (e.g., a DMTC transmission period, 10 ms, 20 ms, 40 ms, 80 ms, or 160 ms) as the successful transmission of the TBs is an indication of the quality of the beamformed link. In some aspects, the second UE may be configured to transmit the beacon signal when the numConsecutiveDTX satisfies a threshold (e.g., number of NACKs is greater than a threshold). In some aspects, the second UE may be configured to transmit the beacon signal when the sl-maxnumConsecutiveDTXForDMTC is greater than a threshold. The first UE may receive an indicator from the second UE indicating that the next scheduled beacon signal will be skipped. For example, the first UE may receive a code point from the second UE in the SCI-1 indicating that the next scheduled beacon signal will be skipped, for example, when the numConsecutiveDTX is less than a threshold.

Further aspects of the present disclosure include the following:

Aspect 1 includes a method of wireless communication performed by a first sidelink user equipment (UE), the method comprising establishing, with a second sidelink UE, a beamformed link; transmitting, to the second sidelink UE, a periodic discovery and measurement timing (DMTC) configuration via the beamformed link; and transmitting, to the second sidelink UE, a periodic beacon signal based on the DMTC configuration.

Aspect 2 includes the method of aspect 1, wherein the transmitting the periodic beacon signal comprises transmitting the periodic beacon signal via a physical sidelink shared channel (PSSCH).

Aspect 3 includes the method of any of aspects 1-2, further comprising refraining from transmitting the periodic beacon signal within a time period after a number of successful communications between the first sidelink UE and the second sidelink UE satisfies a threshold.

Aspect 4 includes the method of any of aspects 1-3, wherein the transmitting the periodic beacon signal comprises transmitting the periodic beacon signal within a DMTC resource window.

Aspect 5 includes the method of any of aspects 1-4, wherein the periodic beacon signal comprises at least one of second-stage sidelink control information (SCI-2); a sidelink channel state information reference signal (SL CSI-RS); a pointer to one or more additional DMTC configurations; or a beam status indicator associated with the beamformed link.

Aspect 6 includes the method of any of aspects 1-5, further comprising receiving, from the second sidelink UE, a status associated with the beamformed link based on the periodic beacon signal.

Aspect 7 includes the method of any of aspects 1-6, further comprising transmitting, to the second sidelink UE, a plurality of periodic beacon signals, wherein the plurality of periodic beacon signals includes the periodic beacon signal; and each of the plurality of periodic beacon signals is transmitted in a different beam direction.

Aspect 8 includes the method of any of aspects 1-7, further comprising receiving, from a base station (BS), the DMTC configuration via a configured grant.

Aspect 9 includes a method of wireless communication performed by a first sidelink user equipment (UE), the method comprising establishing, with a second sidelink UE, a beamformed link; receiving, from the second sidelink UE, a periodic discovery and measurement timing (DMTC) configuration via the beamformed link; and receiving, from the second sidelink UE, a periodic beacon signal based on the DMTC configuration.

Aspect 10 includes the method of aspect 9, wherein the receiving the periodic beacon signal comprises receiving the periodic beacon signal via a physical sidelink shared channel (PSSCH).

Aspect 11 includes the method of any of aspects 9 or 10, wherein the receiving the periodic beacon signal comprises receiving the periodic beacon signal within a DMTC resource window.

Aspect 12 includes method of any of aspects 9-11, wherein the periodic beacon signal comprises at least one of second-stage sidelink control information (SCI-2); a sidelink channel state information reference signal (SL CSI-RS); a pointer to one or more additional DMTC configurations; or a beam status indicator associated with the beamformed link.

Aspect 13 includes the method of any of aspects 9-12, further comprising transmitting, to the second sidelink UE, a status associated with the beamformed link based on the periodic beacon signal.

Aspect 14 includes the method of any of aspects 9-13, further comprising receiving, from the second sidelink UE, a plurality of periodic beacon signals, wherein the plurality of periodic beacon signals includes the periodic beacon signal; and each of the plurality of periodic beacon signals is received from a different beam direction.

Aspect 15 includes the method of any of aspects 9-14, further comprising determining a quality level associated with the periodic beacon signal; generating a beam failure indicator (BFI) based on the quality level not satisfying a threshold; and transmitting, to the second sidelink UE, the BFI via a physical sidelink shared channel (PSSCH).

Aspect 16 includes a non-transitory computer-readable medium storing one or more instructions for wireless communication, the one or more instructions comprising one or more instructions that, when executed by one or more processors of a first sidelink user equipment, cause the one or more processors to perform any one of aspects 1-8.

Aspect 17 includes a non-transitory computer-readable medium storing one or more instructions for wireless communication, the one or more instructions comprising one or more instructions that, when executed by one or more processors of a first sidelink user equipment, cause the one or more processors to perform any one of aspects 9-15.

Aspect 18 includes a first sidelink user equipment (UE) comprising one or more means to perform any one or more of aspects 1-8.

Aspect 19 includes a first sidelink user equipment (UE) comprising one or more means to perform any one or more of aspects 9-15.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular instances illustrated and described herein, as they are merely by way of some examples thereof, but rather, should be fully commensurate with that of the claims appended hereafter and their functional equivalents.

What is claimed is:

1. A method of wireless communication performed by a first sidelink user equipment (UE), the method comprising:
   establishing, with a second sidelink UE, a beamformed link;
   transmitting, to the second sidelink UE, a periodic discovery and measurement timing (DMTC) configuration via the beamformed link;
   transmitting, to the second sidelink UE, a plurality of transport blocks (TBs) via the beamformed link;
   receiving, from the second sidelink UE, a plurality of ACK/NACK responses corresponding to the plurality of TBs;
   incrementing a counter in response to a NACK of the plurality of ACK/NACK responses;
   decreasing the counter in response to an ACK of the plurality of ACK/NACK responses;
   transmitting, to the second sidelink UE, a periodic beacon signal based on the DMTC configuration; and
   refraining from transmitting the periodic beacon signal in response to the counter satisfying a threshold.

2. The method of claim 1, wherein the transmitting the periodic beacon signal comprises transmitting the periodic beacon signal via a physical sidelink shared channel (PSSCH).

3. The method of claim 1, wherein:
   refraining from transmitting the periodic beacon signal in response to the counter satisfying a threshold comprises the counter having a value of zero.

4. The method of claim 1, wherein the transmitting the periodic beacon signal comprises transmitting the periodic beacon signal within a DMTC resource window.

5. The method of claim 1, wherein the periodic beacon signal comprises at least one of:
   second-stage sidelink control information (SCI-2);
   a sidelink channel state information reference signal (SL CSI-RS);
   a pointer to one or more additional DMTC configurations; or
   a beam status indicator associated with the beamformed link.

6. The method of claim 1, further comprising:
   receiving, from the second sidelink UE, a status associated with the beamformed link based on the periodic beacon signal.

7. The method of claim 1, further comprising:
   transmitting, to the second sidelink UE, a plurality of periodic beacon signals, wherein:
   the plurality of periodic beacon signals includes the periodic beacon signal; and
   each of the plurality of periodic beacon signals is transmitted in a different beam direction.

8. The method of claim 1, further comprising:
   receiving, from a base station (BS), the DMTC configuration via a configured grant.

9. A method of wireless communication performed by a first sidelink user equipment (UE), the method comprising:
   establishing, with a second sidelink UE, a beamformed link;
   receiving, from the second sidelink UE, a periodic discovery and measurement timing (DMTC) configuration via the beamformed link;
   receiving, from the second sidelink UE, a periodic beacon signal based on the DMTC configuration;
   receiving, from the second sidelink UE, a beacon signal skip indicator; and
   refraining from receiving the periodic beacon signal in response to the beacon signal skip indicator.

10. The method of claim 9, wherein the receiving the periodic beacon signal comprises receiving the periodic beacon signal via a physical sidelink shared channel (PSSCH).

11. The method of claim 9, wherein the receiving the periodic beacon signal comprises receiving the periodic beacon signal within a DMTC resource window.

12. The method of claim 9, wherein the periodic beacon signal comprises at least one of:
 second-stage sidelink control information (SCI-2);
 a sidelink channel state information reference signal (SL CSI-RS);
 a pointer to one or more additional DMTC configurations; or
 a beam status indicator associated with the beamformed link.

13. The method of claim 9, further comprising:
 transmitting, to the second sidelink UE, a status associated with the beamformed link based on the periodic beacon signal.

14. The method of claim 9, further comprising:
 receiving, from the second sidelink UE, a plurality of periodic beacon signals, wherein:
 the plurality of periodic beacon signals includes the periodic beacon signal; and
 each of the plurality of periodic beacon signals is received from a different beam direction.

15. The method of claim 9, further comprising:
 determining a quality level associated with the periodic beacon signal;
 generating a beam failure indicator (BFI) based on the quality level not satisfying a threshold; and
 transmitting, to the second sidelink UE, the BFI via a physical sidelink shared channel (PSSCH).

16. A first sidelink user equipment (UE) comprising:
 a memory;
 a transceiver; and
 at least one processor coupled to the memory and the transceiver, wherein the first sidelink UE is configured to:
 establish, with a second sidelink UE, a beamformed link;
 transmit, to the second sidelink UE, a periodic discovery and measurement timing (DMTC) configuration via the beamformed link;
 transmit, to the second sidelink UE, a plurality of transport blocks (TBs) via the beamformed link;
 receive, from the second sidelink UE, a plurality of ACK/NACK responses corresponding to the plurality of TBs;
 increment a counter in response to a NACK of the plurality of ACK/NACK responses;
 decrease the counter in response to an ACK of the plurality of ACK/NACK responses;
 transmit, to the second sidelink UE, a periodic beacon signal based on the DMTC configuration; and
 refrain from transmitting the periodic beacon signal in response to the counter satisfying a threshold.

17. The first sidelink UE of claim 16, wherein the first sidelink UE is further configured to:
 transmit the periodic beacon signal via a physical sidelink shared channel (PSSCH).

18. The first sidelink UE of claim 16, wherein the first sidelink UE is further configured to:
 refrain from transmitting the periodic beacon signal in response to the counter having a value of zero.

19. The first sidelink UE of claim 16, wherein the first sidelink UE is further configured to:
 transmit the periodic beacon signal within a DMTC resource window.

20. The first sidelink UE of claim 16, wherein the periodic beacon signal comprises at least one of:
 second-stage sidelink control information (SCI-2);
 a sidelink channel state information reference signal (SL CSI-RS);
 a pointer to one or more additional DMTC configurations; or
 a beam status indicator associated with the beamformed link.

21. The first sidelink UE of claim 16, wherein the first sidelink UE is further configured to:
 receive, from the second sidelink UE, a status associated with the beamformed link based on the periodic beacon signal.

22. The first sidelink UE of claim 16, wherein the first sidelink UE is further configured to:
 transmit, to the second sidelink UE, a plurality of periodic beacon signals, wherein:
 the plurality of periodic beacon signals includes the periodic beacon signal; and
 each of the plurality of periodic beacon signals is transmitted in a different beam direction.

23. The first sidelink UE of claim 16, wherein the first sidelink UE is further configured to:
 receive, from a base station (BS), the DMTC configuration via a configured grant.

24. A first sidelink user equipment (UE) comprising:
 a memory;
 a transceiver; and
 at least one processor coupled to the memory and the transceiver, wherein the first sidelink UE is configured to:
 establish, with a second sidelink UE, a beamformed link;
 receive, from the second sidelink UE, a periodic discovery and measurement timing (DMTC) configuration via the beamformed link;
 receive, from the second sidelink UE, a periodic beacon signal based on the DMTC configuration;
 receive, from the second sidelink UE, a beacon signal skip indicator; and
 refrain from receiving the periodic beacon signal in response to the beacon signal skip indicator.

25. The first sidelink UE of claim 24, wherein the first sidelink UE is further configured to:
 receive the periodic beacon signal via a physical sidelink shared channel (PSSCH).

26. The first sidelink UE of claim 24, wherein the first sidelink UE is further configured to:
 receive the periodic beacon signal within a DMTC resource window.

27. The first sidelink UE of claim 24, wherein the periodic beacon signal comprises at least one of:
 second-stage sidelink control information (SCI-2);
 a sidelink channel state information reference signal (SL CSI-RS);
 a pointer to one or more additional DMTC configurations; or
 a beam status indicator associated with the beamformed link.

28. The first sidelink UE of claim 24, wherein the first sidelink UE is further configured to:
 transmit, to the second sidelink UE, a status associated with the beamformed link based on the periodic beacon signal.

29. The first sidelink UE of claim 24, wherein the first sidelink UE is further configured to:
 receive, from the second sidelink UE, a plurality of periodic beacon signals, wherein:

the plurality of periodic beacon signals includes the periodic beacon signal; and each of the plurality of periodic beacon signals is received from a different beam direction.

30. The first sidelink UE of claim 24, wherein the first sidelink UE is further configured to:

determine a quality level associated with the periodic beacon signal;

generate a beam failure indicator (BFI) based on the quality level not satisfying a threshold; and transmit, to the second sidelink UE, the BFI via a physical sidelink shared channel (PSSCH).

\* \* \* \* \*